US011610477B2

(12) United States Patent
Ogawa et al.

(10) Patent No.: US 11,610,477 B2
(45) Date of Patent: Mar. 21, 2023

(54) TRAFFIC ASSISTANCE SYSTEM, SERVER, AND VEHICLE-MOUNTED DEVICE

(71) Applicant: Sumitomo Electric Industries, Ltd., Osaka (JP)

(72) Inventors: Akihiro Ogawa, Osaka (JP); Katsunori Ushida, Osaka (JP); Koichi Takayama, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/296,256

(22) PCT Filed: Nov. 27, 2019

(86) PCT No.: PCT/JP2019/046405
§ 371 (c)(1),
(2) Date: May 24, 2021

(87) PCT Pub. No.: WO2020/111133
PCT Pub. Date: Jun. 4, 2020

(65) Prior Publication Data
US 2022/0028254 A1    Jan. 27, 2022

(30) Foreign Application Priority Data

Nov. 29, 2018    (JP) .............................. JP2018-222999

(51) Int. Cl.
*G08G 1/01*    (2006.01)
(52) U.S. Cl.
CPC .................................. *G08G 1/0112* (2013.01)
(58) Field of Classification Search
CPC .................................................. G08G 1/0112
See application file for complete search history.

(56) References Cited

U.S. PATENT DOCUMENTS

2019/0239155 A1    8/2019  Ushida et al.
2020/0365014 A1*  11/2020  Ray .................. G08G 1/096775

FOREIGN PATENT DOCUMENTS

JP    2012-173979 A    9/2012
JP    2013-92932 A    5/2013
(Continued)

OTHER PUBLICATIONS

International Search Report and Written Opinion dated Feb. 18, 2020, received for PCT Application PCT/JP2019/046405, Filed on Nov. 27, 2019, 9 pages including English Translation.

*Primary Examiner* — Hongmin Fan
(74) *Attorney, Agent, or Firm* — Xsensus LLP

(57) ABSTRACT

A vehicle-mounted device includes a data collecting device that collects sensor data from a vehicle sensor, a data transmitting device that transmits the sensor data to a server, a data receiving device that receives data about an outside-vehicle status, and an inside-vehicle/outside-vehicle cooperation device that, in response to receipt of the data about the outside-vehicle status, cooperates with a device outside the vehicle and controls an operation inside the vehicle. The server includes a map creating device that maintains a traffic status overview map on the basis of received sensor data, a vehicle selecting device that selects a vehicle capable of transmitting optimum sensor data for maintaining the traffic status overview map in view of a line status among vehicle-mounted devices present within a specific area, and a transmission permission/prohibition signal transmitting device that transmits an instruction of permitting transmission of sensor data to the vehicle.

6 Claims, 11 Drawing Sheets

(56) References Cited

FOREIGN PATENT DOCUMENTS

| JP | 2017-45129 A | 3/2017 |
| JP | 2018-18284 A | 2/2018 |

\* cited by examiner

FIG. 6

| ID | TRANSMISSION SENSOR DATASET | DATA TRANSMISSION INTERVAL [fps] (LiDAR, CAMERA) |
|---|---|---|
| 0 | LiDAR | 5, – |
| 1 | LiDAR | 10, – |
| 2 | LiDAR, CAMERA (SD IMAGE) | 10, 3 |
| 3 | LiDAR, CAMERA (HD IMAGE) | 10, 3 |
| 4 | LiDAR, CAMERA (SD IMAGE) | 10, 10 |
| 5 | LiDAR, CAMERA (FULL HD IMAGE) | 10, 3 |
| 6 | LiDAR, CAMERA (HD IMAGE) | 10, 10 |
| 7 | LiDAR, CAMERA (FULL HD IMAGE) | 10, 10 |

TRAFFIC ASSISTANCE SYSTEM, SERVER, AND VEHICLE-MOUNTED DEVICE

CROSS-REFERENCE TO RELATED APPLICATIONS

The present application is based on PCT filing PCT/JP2019/046405, filed Nov. 27, 2019, which claims priority to JP 2018-222999, filed on Nov. 29, 2018, the entire contents of each are incorporated herein by reference.

TECHNICAL FIELD

The present disclosure relates to a traffic assistance system, server, and method, a vehicle-mounted device and a method for operating the same, a computer program, a recording medium, a computer, and a semiconductor integrated circuit.

BACKGROUND ART

When driving a vehicle, one needs to pay sufficient attention not only to the movement of the vehicle but also to the movements of other vehicles. Particular attention is required when pedestrians are present in addition to vehicles. Hitherto, as illustrated in FIG. 1, there has been a technique of detecting moving objects (hereinafter referred to as "dynamic objects") that are present in a real space 50 by using many sensors, such as a LiDAR and a camera, estimating the attributes thereof (an adult, a child, a vehicle, a two-wheeled vehicle, or the like), and creating a traffic status overview map 52 by using road map data prepared in a virtual space.

To create the traffic status overview map 52, it is necessary to collect sensor data, which is outputs from many sensors, from vehicles having mounted therein the sensors, and from infrastructure sensors, such as cameras, provided along roads. For this purpose, a fifth-generation mobile communication system (so-called "5G") may be used. An example of such a technique is disclosed in PTL 1, which will be given below.

FIG. 2 illustrates, as an example of 5G, a communication system 70 including first to fourth slices.

Referring to FIG. 2, the first slice is a slice that includes vehicles 82 and 84 having mounted therein vehicle-mounted devices 92 and 94, respectively, each of the vehicle-mounted devices 92 and 94 being capable of 5G wireless communication; an infrastructure camera 88 including a wireless communication device 98; a traffic signal controller 90 including a wireless communication device 100; a mobile phone 96 carried by a pedestrian 86; and so forth, and that is defined so that these devices are capable of directly communicating with each other.

The second slice is a slice that includes a plurality of base stations 110, 112, and 114 and that is defined so that these base stations communicate with the communication terminals included in the first slice.

The third slice is a slice that includes metro networks (metro NWs) 120 and 122; edge servers 126 and 128 provided in distributed data centers (distributed DCs) 124 and 130, respectively, the distributed DCs 124 and 130 being connected to the metro NWs; and so forth, and that is defined so that the individual communication terminals are capable of communicating with the edge servers via the base stations 110, 112, and 114 or the like. The metro NW is a communication network constructed to connect buildings, social facilities, houses, and so forth within a limited range, such as a city. The base stations 110, 112, 114, and the like are each connected to any one of edge servers, such as the edge servers 126 and 128.

The fourth slice includes a core NW 140 capable of communicating with a plurality of metro NWs. A core server 144 provided in a core DC 142 connected to the core NW 140 is capable of communicating with the communication devices connected to the individual metro NWs, such as the edge servers 126 and 128.

The above-described traffic status overview map is typically constructed and maintained for a specific range by the edge server 128 or the like. Each communication terminal belonging to the first slice transmits sensor data or the like detected by a sensor equipped therein to, for example, the edge server 126. The edge server 126 combines the pieces of sensor data to reconstruct an actual road status in a virtual space, and creates and maintains the traffic status overview map 52. On the basis of the traffic status overview map 52 maintained in this manner, the edge server 126 transmits information for assisting driving or the like to each communication terminal.

CITATION LIST

Patent Literature

PTL 1: Japanese Unexamined Patent Application Publication No. 2018-018284

SUMMARY OF INVENTION

A traffic assistance system according to a first aspect of the present disclosure is a traffic assistance system including a plurality of vehicle-mounted devices each of which is mounted in one of a plurality of vehicles, each of the plurality of vehicles being equipped with a plurality of types of sensors each of which is capable of collecting data about a surrounding environment; and a traffic assistance server that collects data from the sensors to create a traffic status overview map representing a traffic status in a predetermined range and transmits data for driving assistance to the plurality of vehicle-mounted devices on the basis of the traffic status overview map, via wireless communication with each of the plurality of vehicle-mounted devices. Each of the plurality of vehicle-mounted devices includes a data collecting device that collects sensor data which is data from the sensors equipped in the vehicle having mounted therein the vehicle-mounted device; a first wireless communication device that wirelessly communicates with an outside of the vehicle; a sensor data transmitting device that transmits the sensor data to the traffic assistance server via the first wireless communication device; an outside-vehicle status data receiving device that receives data about an outside-vehicle status from an outside of the vehicle via the first wireless communication device; and an inside-vehicle/outside-vehicle cooperation device that, in response to receipt of the data about the outside-vehicle status, cooperates with a device outside the vehicle and changes an operation inside the vehicle including an operation of the sensor data transmitting device. The traffic assistance server includes a second wireless communication device capable of wirelessly communicating with the first wireless communication device of each of the plurality of vehicle-mounted devices; a traffic status overview map creating device that receives the sensor data from the plurality of vehicle-mounted devices via the second wireless communication device, creates the traffic status overview map on the basis of the received data and road map data, and maintains the traffic status overview map; a vehicle selecting device that selects an area satisfying a specific condition from the traffic status overview map and selects a vehicle having mounted therein a vehicle-mounted device capable of transmitting most effective sensor data for maintaining the traffic status overview map in view of a line status, among vehicle-mounted devices present within the area; and a transmission permission/prohibition signal transmitting device that transmits, via the second wireless communication device, an instruction of permitting transmission of sensor data to the vehicle-mounted device mounted in the vehicle selected by the vehicle selecting device, and an instruction of prohibiting transmission of sensor data to a vehicle-mounted device mounted in a vehicle not selected by the vehicle selecting device. In response to receipt of the instruction, the inside-vehicle/outside-vehicle cooperation device controls the sensor data transmitting device in accordance with the instruction.

A vehicle-mounted device according to a second aspect of the present disclosure is a vehicle-mounted device used in a traffic assistance system including a plurality of vehicle-mounted devices each of which is mounted in one of a plurality of vehicles, each of the plurality of vehicles being equipped with a plurality of types of sensors each of which is capable of collecting data about a surrounding environment; and a traffic assistance server that collects data from the sensors to create a traffic status overview map representing a traffic status in a predetermined range and transmits data for driving assistance to the plurality of vehicle-mounted devices on the basis of the traffic status overview map, via wireless communication with each of the plurality of vehicle-mounted devices. The vehicle-mounted device includes a data collecting device that collects sensor data which is data from the sensors equipped in the vehicle having mounted therein the vehicle-mounted device; a wireless communication device that wirelessly communicates with an outside of the vehicle; a sensor data transmitting device that transmits the sensor data to the traffic assistance server via the wireless communication device; an outside-vehicle status data receiving device that receives data about an outside-vehicle status from an outside of the vehicle via the wireless communication device; and an inside-vehicle/outside-vehicle cooperation device that, in response to receipt of the data about the outside-vehicle status, cooperates with a device outside the vehicle and changes an operation inside the vehicle including at least an operation of the sensor data transmitting device. The inside-vehicle/outside-vehicle cooperation device includes a transmission control device that, in response to receipt of an instruction of permitting or prohibiting transmission of sensor data from the traffic assistance server, controls the sensor data transmitting device in accordance with the instruction.

A traffic assistance server according to a third aspect of the present disclosure is a traffic assistance server used in a traffic assistance system including a plurality of vehicle-mounted devices each of which is mounted in one of a plurality of vehicles, each of the plurality of vehicles being equipped with a plurality of types of sensors each of which is capable of collecting data about a surrounding environment; and a traffic assistance server that collects data from the sensors to create a traffic status overview map representing a traffic status in a predetermined range and transmits data for driving assistance to the plurality of vehicle-mounted devices on the basis of the traffic status overview map, via wireless communication with each of the plurality of vehicle-mounted devices. The traffic assistance server includes a wireless communication device capable of wirelessly communicating with each of the plurality of vehicle-mounted devices; a traffic status overview map creating device that receives the sensor data from the plurality of vehicle-mounted devices via the wireless communication device, creates the traffic status overview map on the basis of the received data and road map data, and maintains the traffic status overview map; a vehicle selecting device that selects an area satisfying a specific condition from the traffic status overview map and selects a vehicle having mounted therein a vehicle-mounted device capable of transmitting most effective sensor data for maintaining the traffic status overview map in view of a line status, among vehicle-mounted devices present within the area; and a transmission permission/prohibition signal transmitting device that transmits, via the wireless communication device, an instruction of permitting transmission of sensor data to the vehicle-mounted device mounted in the vehicle selected by the vehicle selecting device, and an instruction of prohibiting transmission of sensor data to a vehicle-mounted device mounted in a vehicle not selected by the vehicle selecting device.

A traffic assistance method according to a fourth aspect of the present disclosure is a traffic assistance method implemented by a traffic assistance system including a plurality of vehicle-mounted devices each of which is mounted in one of a plurality of vehicles, each of the plurality of vehicles being equipped with a plurality of types of sensors each of which is capable of collecting data about a surrounding environment; and a traffic assistance server that collects data from the sensors to create a traffic status overview map representing a traffic status in a predetermined range and transmits data for driving assistance to the plurality of vehicle-mounted devices on the basis of the traffic status overview map, via wireless communication with each of the plurality of vehicle-mounted devices. The traffic assistance method includes, in each of the plurality of vehicle-mounted devices, a step of collecting sensor data which is data from the sensors equipped in the vehicle having mounted therein the vehicle-mounted device; a step of transmitting the sensor data to the traffic assistance server via wireless communication; a step of receiving data about an outside-vehicle status from an outside of the vehicle via wireless communication; and a step of, in response to receipt of the data about the outside-vehicle status, cooperating with a device outside the vehicle and changing an operation inside the vehicle including at least an operation of the step of transmitting the sensor data, and, in the traffic assistance server, a step of receiving the sensor data from the plurality of vehicle-mounted devices via a wireless communication, creating the traffic status overview map on the basis of the received data and road map data, and maintaining the traffic status overview map; a step of selecting an area satisfying a specific condition from the traffic status overview map and selecting a vehicle having mounted therein a vehicle-mounted device capable of transmitting most effective sensor data for maintaining the traffic status overview map in view of a line status, among vehicle-mounted devices present within the area; and a step of transmitting, via wireless communication, an instruction of permitting transmission of sensor data to the vehicle-mounted device mounted in the selected vehicle, and an instruction of prohibiting transmission of sensor data to a vehicle-mounted device mounted in a vehicle not selected by the vehicle selecting device. The step of changing an operation inside the vehicle includes a step of, in response to receipt of the instruction, controlling the step of transmitting the sensor data in accordance with the instruction.

A method for operating a vehicle-mounted device according to a fifth aspect of the present disclosure is a method for operating a vehicle-mounted device in a traffic assistance system including a plurality of vehicle-mounted devices each of which is mounted in one of a plurality of vehicles, each of the plurality of vehicles being equipped with a plurality of types of sensors each of which is capable of collecting data about a surrounding environment; and a traffic assistance server that collects data from the sensors to create a traffic status overview map representing a traffic status in a predetermined range and transmits data for driving assistance to the plurality of vehicle-mounted devices on the basis of the traffic status overview map, via wireless communication with each of the plurality of vehicle-mounted devices. The method includes a step of collecting sensor data which is data from the sensors equipped in the vehicle having mounted therein the vehicle-mounted device; a step of transmitting the sensor data to the traffic assistance server via wireless communication; a step of receiving data about an outside-vehicle status from an outside of the vehicle via wireless communication; and a step of, in response to receipt of the data about the outside-vehicle status, cooperating with a device outside the vehicle and changing an operation inside the vehicle including at least an operation of the step of transmitting the sensor data. The step of changing an operation inside the vehicle includes a step of, in response to receipt of an instruction of permitting or prohibiting transmission of sensor data from the traffic assistance server, controlling the step of transmitting the sensor data in accordance with the instruction.

A method for operating a traffic assistance server according to a sixth aspect of the present disclosure is a method for operating a traffic assistance server used in a traffic assistance system including a plurality of vehicle-mounted devices each of which is mounted in one of a plurality of vehicles, each of the plurality of vehicles being equipped with a plurality of types of sensors each of which is capable of collecting data about a surrounding environment; and a traffic assistance server that collects data from the sensors to create a traffic status overview map representing a traffic status in a predetermined range and transmits data for driving assistance to the plurality of vehicle-mounted devices on the basis of the traffic status overview map, via wireless communication with each of the plurality of vehicle-mounted devices. The method includes a step of receiving the sensor data from the plurality of vehicle-mounted devices via wireless communication, creating the traffic status overview map on the basis of the received data and road map data, and maintaining the traffic status overview map; a step of selecting an area satisfying a specific condition from the traffic status overview map and selecting a vehicle having mounted therein a vehicle-mounted device capable of transmitting most effective sensor data for maintaining the traffic status overview map in view of a line status, among vehicle-mounted devices present within the area; and a step of transmitting, via wireless communication, an instruction of permitting transmission of sensor data to the vehicle-mounted device mounted in the vehicle selected in the step of selecting the vehicle, and an instruction of prohibiting transmission of sensor data to a vehicle-mounted device mounted in a vehicle not selected by the vehicle selecting device.

A computer program according to a seventh aspect of the present disclosure is a computer program that causes a computer to operate as a vehicle-mounted device in a traffic assistance system including a plurality of vehicle-mounted devices each of which is mounted in one of a plurality of vehicles, each of the plurality of vehicles being equipped with a plurality of types of sensors each of which is capable of collecting data about a surrounding environment; and a traffic assistance server that collects data from the sensors to create a traffic status overview map representing a traffic status in a predetermined range and transmits data for driving assistance to the plurality of vehicle-mounted devices on the basis of the traffic status overview map, via wireless communication with each of the plurality of vehicle-mounted devices. The computer program includes a step of collecting, by the computer, sensor data which is data from the sensors equipped in the vehicle having mounted therein the vehicle-mounted device; a step of transmitting, by the computer, the sensor data to the traffic assistance server via wireless communication; a step of receiving, by the computer, data about an outside-vehicle status from an outside of the vehicle via wireless communication; and a step of, in response to receipt of the data about the outside-vehicle status, cooperating, by the computer, with a device outside the vehicle and changing, by the computer, an operation inside the vehicle including at least an operation of the step of transmitting the sensor data. The step of changing an operation inside the vehicle includes a step of, in response to receipt of an instruction of permitting or prohibiting transmission of sensor data from the traffic assistance server, controlling, by the computer, the step of transmitting the sensor data in accordance with the instruction.

A recording medium according to an eighth aspect of the present disclosure is a recording medium having recorded thereon the above-described computer program.

A computer according to a ninth aspect of the present disclosure is a computer programmed with the above-described computer program.

A semiconductor integrated circuit according to a tenth aspect of the present disclosure is a semiconductor integrated circuit having implemented therein the above-described computer.

A semiconductor integrated circuit according to an eleventh aspect of the present disclosure is programmed to function as an inside-vehicle/outside-vehicle cooperation device that is mounted in a vehicle and that is for causing a functional unit in the vehicle to operate in cooperation with an outside of the vehicle. The semiconductor integrated circuit is programmed to execute a method including a step of collecting sensor data which is data from a sensor equipped in the vehicle; a step of transmitting the sensor data to an external device via wireless communication; a step of receiving data about a status outside the vehicle and an instruction for the vehicle from the external device via wireless communication; a step of, in response to receipt of the data about the status outside the vehicle, distributing the data to the functional unit; and a step of, in response to the instruction, changing a process in either or both of the step of collecting the sensor data and the step of transmitting the sensor data.

BRIEF DESCRIPTION OF DRAWINGS

FIG. 6 is a schematic diagram illustrating a table group of transmission datasets stored in the traffic assistance server.

DESCRIPTION OF EMBODIMENTS

Figure 1:
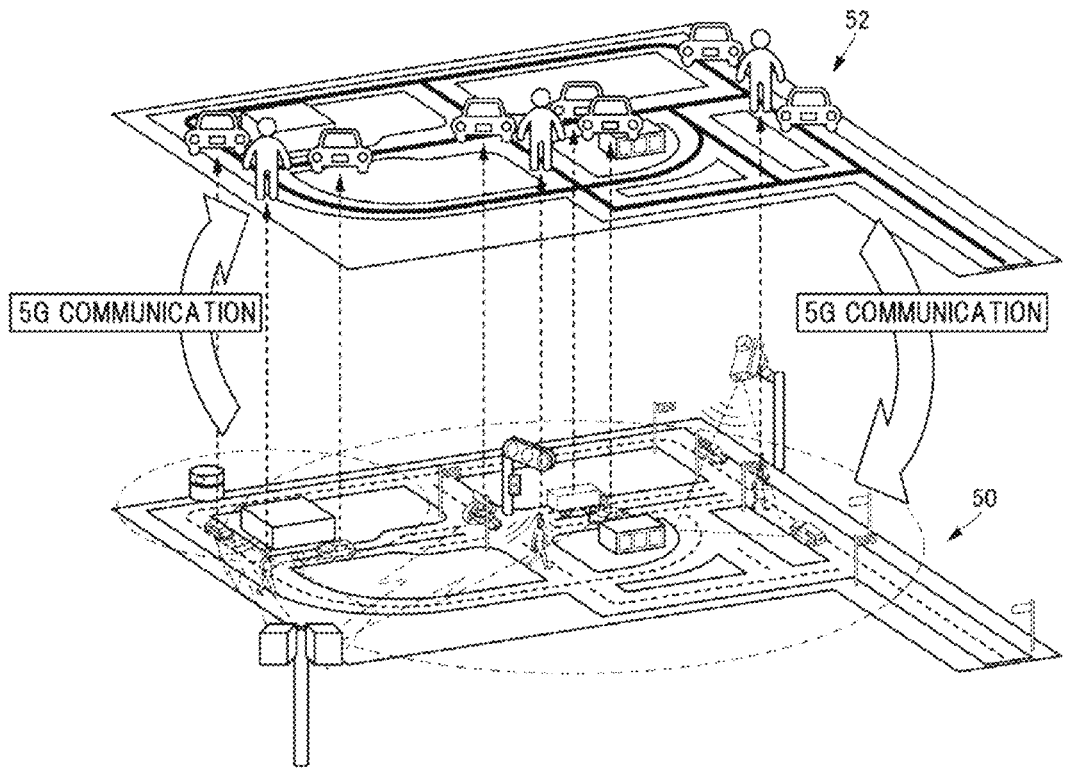
FIG. 1 is a diagram schematically illustrating the relationship between an actual road status and a traffic status overview map.
Figure 2:
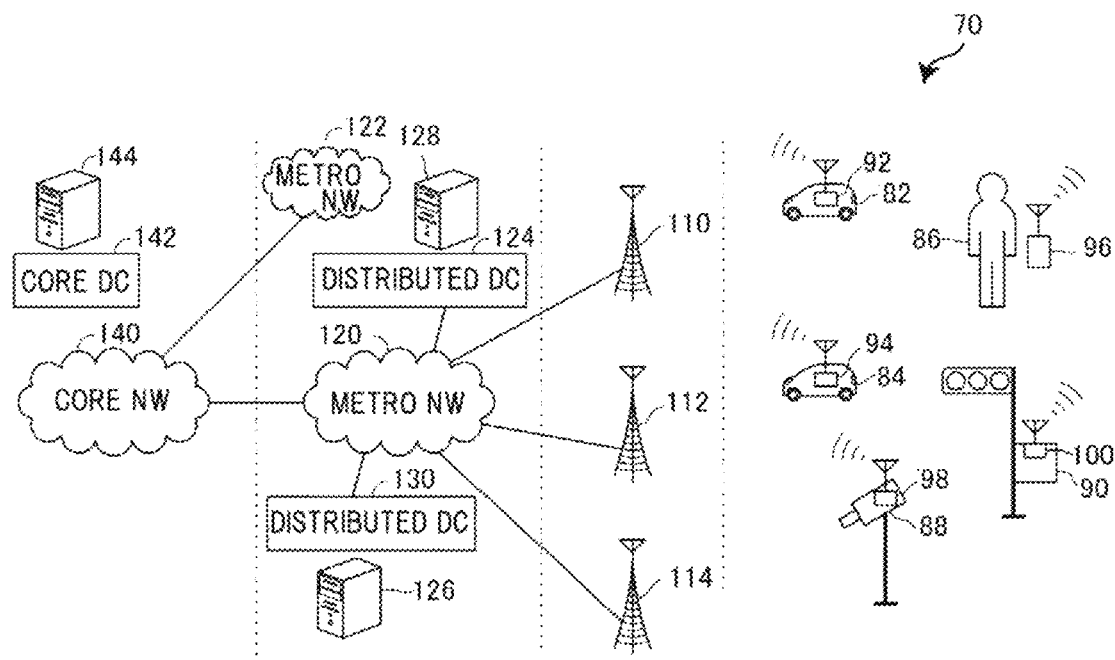
FIG. 2 is a diagram illustrating the configuration of a communication system illustrated in PTL 1.

Problems to be Solved by Present Disclosure

The communication system as disclosed in PTL 1 is capable of constructing and maintaining the traffic status overview map 52. Dynamic information and caution information about traffic obtained from the traffic status overview map 52 are transmitted to individual communication terminals. As a result, for example, vehicles having mounted therein such communication terminals are capable of knowing a road status when necessary and using the road status for traffic safety.

However, the above-described related art still has issues to be solved. One of the issues is variation in communication speed. During traveling of a vehicle, the speed of communication between the vehicle and a base station varies, and a load on an intra-vehicle network and a load on a central processing unit (CPU) included in a vehicle-mounted device mounted in the vehicle vary. Thus, the amount of sensor data that can be transmitted from the vehicle to an edge server (transmission capacity) varies. This may cause a situation in which it is impossible to transmit necessary information to the edge server. In addition, when the number of vehicles increases, an issue arises: the amount of sensor data transmitted from the individual vehicles to the edge server becomes very large, communication line congestion occurs, and an excessive load is imposed on a core server due to concentration of a large amount of data in the edge server. Such an issue may cause a situation in which it is impossible to maintain the quality of the traffic status overview map.

Accordingly, an object of the present disclosure is to provide a traffic assistance system, server, and method, a vehicle-mounted device and a method for operating the same, a computer program, a recording medium, a computer, and a semiconductor integrated circuit that are capable of maintaining the quality of a traffic status overview map while preventing a load on a server from becoming excessive.

DESCRIPTION OF EMBODIMENTS OF PRESENT DISCLOSURE

In the following description and the drawings, the same components are denoted by the same reference numerals. Thus, a detailed description of these components will not be repeated. At least parts of the following embodiments may be combined in any manner.

A traffic assistance system according to a first aspect of the present disclosure is a traffic assistance system including a plurality of vehicle-mounted devices each of which is mounted in one of a plurality of vehicles, each of the plurality of vehicles being equipped with a plurality of types of sensors each of which is capable of collecting data about a surrounding environment; and a traffic assistance server that collects data from the sensors to create a traffic status overview map representing a traffic status in a predetermined range and transmits data for driving assistance to the plurality of vehicle-mounted devices on the basis of the traffic status overview map, via wireless communication with each of the plurality of vehicle-mounted devices. Each of the plurality of vehicle-mounted devices includes a data collecting device that collects sensor data which is data from the sensors equipped in the vehicle having mounted therein the vehicle-mounted device; a first wireless communication device that wirelessly communicates with an outside of the vehicle; a sensor data transmitting device that transmits the sensor data to the traffic assistance server via the first wireless communication device; an outside-vehicle status data receiving device that receives data about an outside-vehicle status from an outside of the vehicle via the first wireless communication device; and an inside-vehicle/outside-vehicle cooperation device that, in response to receipt of the data about the outside-vehicle status, cooperates with a device outside the vehicle and changes an operation inside the vehicle including at least an operation of the sensor data transmitting device. The traffic assistance server includes a second wireless communication device capable of wirelessly communicating with the first wireless communication device of each of the plurality of vehicle-mounted devices; a traffic status overview map creating device that receives the sensor data from the plurality of vehicle-mounted devices via the second wireless communication device, creates the traffic status overview map on the basis of the received data and road map data, and maintains the traffic status overview map; a vehicle selecting device that selects an area satisfying a specific condition from the traffic status overview map and selects a vehicle having mounted therein a vehicle-mounted device capable of transmitting most effective sensor data for maintaining the traffic status overview map in view of a line status, among vehicle-mounted devices present within the area; and a transmission permission/prohibition signal transmitting device that transmits, via the second wireless communication device, an instruction of permitting transmission of sensor data to the vehicle-mounted device mounted in the vehicle selected by the vehicle selecting device, and an instruction of prohibiting transmission of sensor data to a vehicle-mounted device mounted in a vehicle not selected by the vehicle selecting device. In response to receipt of the instruction, the inside-vehicle/outside-vehicle cooperation device controls the sensor data transmitting device in accordance with the instruction.

In the area satisfying the specific condition, a limited vehicle is selected in view of a line status and transmits sensor data to the traffic assistance server. Such a vehicle is selected so as to have a data transmission ability sufficient to manage and maintain the traffic status overview map in accordance with a line status. The other vehicles are prohibited from transmitting sensor data to the traffic assistance server. As a result, a situation can be prevented in which the server receives a large amount of sensor data and in which the load on the server becomes excessive in accordance with a change in the line status and the quality of the traffic status overview map is affected. Here, the "line" is a communication line used for wirelessly communicating with an external device.

The vehicle selecting device may include an area selecting device that selects, from the traffic status overview map, an area satisfying either or both of a condition of a first-type area in which a predetermined number or more of dynamic objects are present within a certain range, and a condition of a second-type area in which a dynamic object having a specific attribute is present; and an effective vehicle selecting device that selects a vehicle having mounted therein a vehicle-mounted device capable of transmitting most effective sensor data for maintaining the traffic status overview map in accordance with a status of the area selected by the area selecting device and a line status, among vehicle-mounted devices present within the area.

A selected area needs to satisfy the specific condition. In accordance with the specific condition, a vehicle that transmits sensor data can be appropriately selected in each area. A different vehicle may be selected in a different status. As a result, a vehicle capable of transmitting appropriate sensor data to the traffic assistance server is permitted to transmit sensor data in accordance with the status of each area and a line status. Thus, concentration of excessive sensor data in the traffic assistance server is prevented, and appropriate data is transmitted to the traffic assistance server in accordance with the status of each area. As a result, the quality of the traffic status overview map can be kept high in accordance with a change in the line status.

The traffic assistance server may further include a priority policy storage device that stores a plurality of sensor priority policies each indicating a priority with which sensor data is to be transmitted for maintaining the traffic status overview map in accordance with a condition of an area selected by the area selecting device and a line status; and a priority policy determining device that determines, for each of areas selected by the area selecting device, a sensor priority policy from among the priority policies stored in the priority policy storage device in accordance with a reason for which the area has been selected, that is, on the basis of a reason for which the area has been selected. The vehicle selecting device may include a selection-by-sensor-priority-policy device that selects, in accordance with the sensor priority policy determined by the priority policy determining device, a vehicle having mounted therein a vehicle-mounted device capable of transmitting sensor data conforming most to the sensor priority policy among vehicle-mounted devices present within the area selected by the area selecting device.

In a selected area, different types of sensor data may be important to manage and maintain the traffic status overview map depending on the reason for which the area has been selected. Thus, which sensor data is to be preferentially transmitted to the traffic assistance server in accordance with a line status in which area is determined in advance as sensor priority policies, an appropriate sensor priority policy is selected for each area, and a vehicle capable of transmitting effective data is permitted to transmit sensor data to the traffic assistance server in accordance with the selected sensor priority policy. In this way, it is possible to keep the quality of the traffic status overview map high while preventing the amount of sensor data transmitted to the traffic assistance server from becoming excessive in accordance with a change in the line status.

The second-type area may be any one of a child detection area in which presence of a child in the area has been detected, a dangerous object detection area in which presence of a dynamic object that takes a predetermined dangerous action in the area has been detected, an accident area in which occurrence of a vehicle accident in the area has been detected, and a disabled vehicle area in which presence of a disabled vehicle in the area has been detected.

A child often makes a quick movement and is a dangerous dynamic object for vehicles. Thus, in an area in which a child has been detected, it is important to detect position information of the dynamic object with high definition, not with a detailed image. The same applies to, for example, a pedestrian holding a smartphone in his/her hand. On the other hand, when a vehicle involved in an accident, a disabled vehicle, or the like is present on a road, it is not necessary to transmit the position thereof to the traffic assistance server with high definition because such a vehicle is less likely to move. Regarding such a vehicle involved in an accident or a disabled vehicle, the status around the vehicle involved in an accident or the disabled vehicle is accurately reported to the traffic assistance server if the status thereof is accurately transmitted to the traffic assistance server. As a result, the information of the traffic status overview map can be made accurate. Thus, concentration of sensor data in the traffic assistance server can be prevented.

The plurality of types of sensors may include at least a sensor that detects position information of a dynamic object, and an imaging sensor that is mounted in the vehicle and that captures an image of an outside of the vehicle. In this specification, an imaging sensor is typically a camera capable of capturing a moving image. The camera may be a monochrome camera or a color camera. Alternatively, the camera may be a stereo camera.

A sensor for detecting position information of a dynamic object is required to track the movement of a dynamic object that moves often, such as a child described above. On the other hand, a vehicle involved in an accident or a disabled vehicle does not move. To provide the traffic assistance server with the detailed status thereof, an image may be preferably used, and an imaging sensor is necessary for this purpose. At least these two types of sensors are mounted in a vehicle, and accordingly it is possible to accurately maintain the traffic status overview map while preventing the amount of sensor data to be transmitted to the traffic assistance server from becoming excessive.

The plurality of sensor priority policies may include a first policy of giving a higher priority to position data of a dynamic object than to attribute data of the dynamic object, and a second policy of giving a higher priority to attribute data of a dynamic object than to position data of the dynamic object. The priority policy determining device may select the first policy when the second-type area is the child detection area or the dangerous object detection area, and may select the second policy when the second-type area is the accident area or the disabled vehicle area.

In a case where the above-described sensor priority polices are adopted, a high priority is given to position data of a dynamic object when a dynamic object that moves often, such as a child, is detected, and a high priority is given to attribute data of a dynamic object when a dynamic object that does not move but whose detailed data is necessary, such as a vehicle involved in an accident, is detected. At the selection of a vehicle, a vehicle capable of transmitting data effective to the process of the traffic assistance server is selected in accordance with a sensor priority policy determined in this manner. As a result, it is possible to keep the accuracy of the traffic status overview map high while preventing a situation in which sensor data concentrates in the traffic assistance server and the load thereon becomes excessive.

The plurality of sensor priority policies may further include a third policy of equally handling position data and attribute data of a dynamic object. The priority policy determining device may select the third policy when the second-type area is the child detection area or the dangerous object detection area and is the accident area or the disabled vehicle area.

The third sensor priority policy of equally handing both position data and attribute data is prepared. As a result, even when it is difficult to determine which of the first sensor priority policy and the second sensor priority policy is to be adopted, a vehicle that transmits sensor data can be selected on the basis of a fixed policy.

The traffic assistance server may further include a determining device that, in response to selection of the accident area or the disabled vehicle area by the area selecting device, determines whether or not there is a vehicle that has mounted therein an imaging sensor whose detection range includes the area and that is capable of transmitting in real time video captured by the imaging sensor; a transmission instruction device that, in response to an affirmative determination made by the determining device, instructs the vehicle to transmit data of video captured by the imaging sensor, that is, instructs the vehicle determined to be capable of transmitting the video in real time by the determining device to transmit data of the video; and a buffering instruction device that, in response to a negative determination made by the determining device, selects a vehicle capable of transmitting highest-definition image data from among vehicles within the area, and transmits, via the second wireless communication device, a buffering instruction to buffer image data and transmit the buffered image data to the traffic assistance server at a transmittable timing.

It may be difficult to transmit detailed sensor data to the traffic assistance server depending on a traffic status, for example, when a line status is unfavorable. Even in such a case, in an area in which a vehicle involved in an accident, a disabled vehicle, a fallen tree, a fallen object, or the like is present, the detailed status thereof may be transmitted to the traffic assistance server. However, such an object does not move and thus data representing the detailed status (for example, high-resolution image data) or the like need not necessarily be transmitted to the traffic assistance server in real time. Thus, when there is not a vehicle capable of performing real-time transmission, any of vehicles travelling nearby buffers sensor data of the surroundings and transmits the sensor data to the traffic assistance server when the line status improves. As a result, even when the line status is unfavorable, sensor data effective for the process of the traffic assistance server can be transmitted to the traffic assistance server.

The sensor data transmitting device may include a sensor data/detection range transmitting device that transmits, to the traffic assistance server via the first wireless communication device, the sensor data and data indicating a detection range of the imaging sensor of the vehicle having mounted therein the vehicle-mounted device. The buffering instruction device may select a candidate vehicle having mounted therein an imaging sensor whose current or future detection range includes the area, on the basis of the data transmitted from the sensor data/detection range transmitting device and indicating the detection range, the road map data, and a travelling direction of the vehicle having mounted therein the vehicle-mounted device, and may instruct the vehicle to buffer image data and transmit the buffered image data to the traffic assistance server at a transmittable timing.

A vehicle that performs buffering may have a sensor that covers a target area. Thus, each vehicle transmits information capable of specifying the sensor detection range of the vehicle to the traffic assistance server. The traffic assistance server selects a candidate vehicle on the basis of the information. The buffered information indicates a status of a wide range of the target area, and the process of the traffic assistance server is performed more accurately.

Each of the plurality of vehicle-mounted devices may further include a buffering device that performs buffering on sensor data from each sensor equipped in the vehicle having mounted therein the vehicle-mounted device, and a buffered data transmitting device that transmits the sensor data buffered by the buffering device to the traffic assistance server. The inside-vehicle/outside-vehicle cooperation device may include a buffering starting device that, in response to receipt of the buffering instruction, causes the buffering device to start buffering; a buffered data transmission starting device that, in response to a line speed from the vehicle-mounted device to the traffic assistance server being higher than or equal to a predetermined value, causes the buffered data transmitting device to start transmitting sensor data; a buffering stopping device that, in response to receipt of a buffering termination instruction, causes the buffering device to stop the buffering of the sensor data; and a sensor data transmission starting device that, in response to termination of data transmission by the buffered data transmitting device, causes the sensor data transmitting device to start transmitting the sensor data to the traffic assistance server.

A vehicle mounted-device that has received a buffering instruction starts buffering of sensor data, and starts transmitting the buffered sensor data to the traffic assistance server when the line speed becomes higher than or equal to a predetermined value. Because the sensor data is transmitted to the traffic assistance server when the line status becomes favorable, the sensor data can be efficiently transmitted.

The selection-by-sensor-priority-policy device may include an inquiring device that transmits, for each of areas selected by the area selecting device, to each of vehicle-mounted devices present within the area, an inquiry inquiring a transmission ability for sensor data transmittable to the traffic assistance server for maintaining the traffic status overview map in view of a line status, together with data indicating the determined sensor priority policy, via the second wireless communication device; and a device that selects a vehicle having mounted therein a vehicle-mounted device that has transmitted a response indicating a highest transmission ability in response to the inquiry from the inquiring device. Each of the plurality of vehicle-mounted devices may include a responding device that, in response to receipt of the inquiry, transmits a response indicating the transmission ability to the traffic assistance server via the first wireless communication device, on the basis of types and abilities of the sensors equipped in the vehicle having mounted therein the vehicle-mounted device, the data indicating the sensor priority policy received from the inquiring device, and any combination of a line speed available for communication with the traffic assistance server, a degree of congestion of an intra-vehicle network, and a calculation resource available to the vehicle-mounted device.

The traffic assistance server transmits an inquiry about a transmission ability corresponding to a line status to vehicle-mounted devices, together with data indicating a determined sensor priority policy. Each vehicle-mounted device is capable of calculating the transmission ability for sensor data to be transmitted from the vehicle-mounted device to the traffic assistance server in accordance with the data indicating the sensor priority policy. At the time of calculation, a line speed, a degree of congestion of an intra-vehicle network, and a calculation resource are considered. As a result, it is possible to select a vehicle-mounted device capable of efficiently transmitting sensor data to the traffic assistance server in a method conforming to the sensor priority policy in accordance with a change in the line status.

The responding device may include a transmission ability calculating device that, in response to receipt of the inquiry, calculates transmission abilities by using the line speed, the degree of congestion of the intra-vehicle network, and the calculation resource available to the vehicle-mounted device, respectively, on the basis of the data indicating the sensor priority policy received from the inquiring device; and a transmission ability selecting device that selects a lowest transmission ability from among the transmission abilities calculated by the transmission ability calculating device and transmits the selected transmission ability to the traffic assistance server.

The traffic assistance server transmits an inquiry about a transmission ability to vehicle-mounted devices, together with data indicating a determined sensor priority policy. Each vehicle-mounted device is capable of calculating the transmission ability for sensor data to be transmitted from the vehicle-mounted device to the traffic assistance server in accordance with the data indicating the sensor priority policy. At the time of calculation, possible transmission speeds are calculated in consideration of a line speed, a degree of congestion of an intra-vehicle network, and a calculation resource, and the lowest transmission speed is selected and transmitted to the traffic assistance server. As a result, it is possible to efficiently transmit sensor data to the traffic assistance server in a method conforming to the sensor priority policy and reduce an influence on vehicle control.

Each of the plurality of vehicle-mounted devices may include a transmission continuing device that, in response to receipt of the instruction of permitting transmission of the sensor data from the traffic assistance server via the first wireless communication device, continues a process of transmitting the sensor data to the traffic assistance server via the first wireless communication device; and a transmission stopping device that, in response to receipt of the instruction of prohibiting transmission of the sensor data from the traffic assistance server via the first wireless communication device, stops transmission of the sensor data.

In accordance with an instruction from the traffic assistance server, a vehicle-mounted device capable of transmitting necessary sensor data to the traffic assistance server transmits the sensor data, and the other vehicle-mounted devices are prohibited from transmitting sensor data. Accordingly, a plurality of vehicles in the same area do not simultaneously transmit similar sensor data to the traffic assistance server, and concentration of sensor data in the traffic assistance server can be prevented.

A vehicle-mounted device according to a second aspect of the present disclosure is a vehicle-mounted device used in a traffic assistance system including a plurality of vehicle-mounted devices each of which is mounted in one of a plurality of vehicles, each of the plurality of vehicles being equipped with a plurality of types of sensors each of which is capable of collecting data about a surrounding environment; and a traffic assistance server that collects data from the sensors to create a traffic status overview map representing a traffic status in a predetermined range and transmits data for driving assistance to the plurality of vehicle-mounted devices on the basis of the traffic status overview map, via wireless communication with each of the plurality of vehicle-mounted devices. The vehicle-mounted device includes a data collecting device that collects sensor data which is data from the sensors equipped in the vehicle having mounted therein the vehicle-mounted device; a wireless communication device that wirelessly communicates with an outside of the vehicle; a sensor data transmitting device that transmits the sensor data to the traffic assistance server via the wireless communication device; an outside-vehicle status data receiving device that receives data about an outside-vehicle status from an outside of the vehicle via the wireless communication device; and an inside-vehicle/outside-vehicle cooperation device that, in response to receipt of the data about the outside-vehicle status, cooperates with a device outside the vehicle and changes an operation inside the vehicle including an operation of the sensor data transmitting device. The inside-vehicle/outside-vehicle cooperation device includes a transmission control device that, in response to receipt of an instruction of permitting or prohibiting transmission of sensor data from the traffic assistance server, controls the sensor data transmitting device in accordance with the instruction.

In an area satisfying a specific condition, the vehicle-mounted device of a limited vehicle is selected and transmits sensor data to the traffic assistance server. Such a vehicle is selected so as to have a data transmission ability sufficient to manage and maintain the traffic status overview map. The other vehicles are prohibited from transmitting sensor data to the traffic assistance server. As a result, a situation can be prevented in which the server receives excessive sensor data and in which the load on the server becomes excessive and the quality of the traffic status overview map is affected.

The traffic assistance server may determine a sensor priority policy indicating a priority with which sensor data is to be transmitted in accordance with a type of the sensor data and a line status, and may transmit, to the vehicle-mounted device, an inquiry inquiring a transmission ability for sensor data transmittable to the traffic assistance server for maintaining the traffic status overview map, together with data indicating the determined sensor priority policy. The vehicle-mounted device may further include a responding device that, in response to receipt of the inquiry, calculates the transmission ability on the basis of types and abilities of the sensors equipped in the vehicle having mounted therein the vehicle-mounted device, the received data indicating the sensor priority policy, and any combination of a line speed available for communication with the traffic assistance server, a degree of congestion of an intra-vehicle network of the vehicle having mounted therein the vehicle-mounted device, and a calculation resource available to the vehicle-mounted device, and transmits a response to the traffic assistance server via the wireless communication device.

The traffic assistance server transmits an inquiry about a transmission ability to vehicle-mounted devices, together with data indicating a determined sensor priority policy. Each vehicle-mounted device is capable of calculating the transmission ability for sensor data to be transmitted from the vehicle-mounted device to the traffic assistance server in accordance with the data indicating the sensor priority policy. At the time of calculation, a line speed, a degree of congestion of an intra-vehicle network, and a calculation resource are considered. As a result, it is possible to select a vehicle-mounted device capable of efficiently transmitting sensor data to the traffic assistance server in a method conforming to the sensor priority policy in accordance with a change in the line status.

The responding device may include a transmission ability calculating device that, in response to receipt of the inquiry, calculates transmission abilities by using the line speed, the degree of congestion of the intra-vehicle network, and the calculation resource available to the vehicle-mounted device, respectively, on the basis of a data generation amount per unit time determined by types and abilities of the sensors equipped in the vehicle having mounted therein the vehicle-mounted device, and the data indicating the sensor priority policy received from the inquiring device; and a transmission ability selecting device that selects a lowest transmission ability from among the transmission abilities calculated by the transmission ability calculating device and transmits the selected transmission ability to the traffic assistance server.

The traffic assistance server transmits an inquiry about a transmission ability to vehicle-mounted devices, together with data indicating a determined sensor priority policy. Each vehicle-mounted device is capable of calculating the transmission ability for sensor data to be transmitted from the vehicle-mounted device to the traffic assistance server in accordance with the data indicating the sensor priority policy. At the time of calculation, possible transmission speeds are calculated in consideration of a line speed, a degree of congestion of an intra-vehicle network, and a calculation resource, and the lowest transmission speed is selected and transmitted to the traffic assistance server. As a result, it is possible to efficiently transmit sensor data to the traffic assistance server in a method conforming to the sensor priority policy and reduce an influence on vehicle control.

The inside-vehicle/outside-vehicle cooperation device may further include a transmission continuing device that, in response to receipt of the instruction of permitting transmission of the sensor data from the traffic assistance server via the wireless communication device, continues a process of transmitting the sensor data to the traffic assistance server by the sensor data transmitting device; and a transmission stopping device that, in response to receipt of the instruction of prohibiting transmission of the sensor data from the traffic assistance server via the wireless communication device, stops transmission of the sensor data by the sensor data transmitting device.

In accordance with an instruction from the traffic assistance server, a vehicle-mounted device capable of transmitting necessary sensor data to the traffic assistance server transmits the sensor data, and the other vehicle-mounted devices are prohibited from transmitting sensor data. Accordingly, a plurality of vehicles in the same area do not simultaneously transmit similar sensor data to the traffic assistance server, and concentration of sensor data in the traffic assistance server can be prevented.

The sensor data transmitting device may include a sensor data/detection range transmitting device that transmits, to the traffic assistance server via the wireless communication device, the sensor data and data indicating a detection range of the sensors of the vehicle having mounted therein the vehicle-mounted device.

A vehicle that performs buffering may have a sensor that covers a target area. Thus, each vehicle transmits information capable of specifying the sensor detection range of the vehicle to the traffic assistance server. The traffic assistance server selects a candidate vehicle on the basis of the information. The buffered information indicates a status of a wide range of the target area, and the process of the traffic assistance server is performed more accurately.

The traffic assistance server may have a function of transmitting, to the vehicle-mounted device, a buffering instruction to buffer sensor data for an area satisfying a specific condition and transmit the buffered sensor data to the traffic assistance server at a transmittable timing. The vehicle-mounted device may further include a buffering device that performs buffering on sensor data from each sensor equipped in the vehicle having mounted therein the vehicle-mounted device; and a buffered data transmitting device that transmits the sensor data buffered by the buffering device to the traffic assistance server. The inside-vehicle/outside-vehicle cooperation device may further include a buffering starting device that, in response to receipt of the buffering instruction, causes the buffering device to start buffering; a buffered data transmission starting device that, in response to a line speed from the vehicle-mounted device to the traffic assistance server being higher than or equal to a predetermined value, causes the buffered data transmitting device to start transmitting sensor data; a buffering stopping device that, in response to termination of data transmission by the buffered data transmitting device, causes the buffering device to stop the buffering of the sensor data; and a sensor data transmission starting device that, in response to termination of data transmission by the buffered data transmitting device, causes the sensor data transmitting device to start transmitting the sensor data to the traffic assistance server.

A vehicle mounted-device that has received a buffering instruction starts buffering of sensor data, and starts transmitting the buffered sensor data to the traffic assistance server when the line speed becomes higher than or equal to a predetermined value. Because the sensor data is transmitted to the traffic assistance server when the line status becomes favorable, the sensor data can be efficiently transmitted.

A traffic assistance server according to a third aspect of the present disclosure is a traffic assistance server used in a traffic assistance system including a plurality of vehicle-mounted devices each of which is mounted in one of a plurality of vehicles, each of the plurality of vehicles being equipped with a plurality of types of sensors each of which is capable of collecting data about a surrounding environment; and a traffic assistance server that collects sensor data which is data from the sensors to create a traffic status overview map representing a traffic status in a predetermined range and transmits data for driving assistance to the plurality of vehicle-mounted devices on the basis of the traffic status overview map, via wireless communication with each of the plurality of vehicle-mounted devices. The traffic assistance server includes a wireless communication device capable of wirelessly communicating with each of the plurality of vehicle-mounted devices; a traffic status overview map creating device that receives the sensor data from the plurality of vehicle-mounted devices via the wireless communication device, creates the traffic status overview map on the basis of the received data and road map data, and maintains the traffic status overview map; a vehicle selecting device that selects an area satisfying a specific condition from the traffic status overview map and selects a vehicle having mounted therein a vehicle-mounted device capable of transmitting most effective sensor data for maintaining the traffic status overview map in view of a line status, among vehicle-mounted devices present within the area; and a transmission permission/prohibition signal transmitting device that transmits, via the wireless communication device, an instruction of permitting the vehicle-mounted device mounted in the vehicle selected by the vehicle selecting device to transmit sensor data and prohibiting a vehicle-mounted device mounted in a vehicle not selected by the vehicle selecting device from transmitting sensor data, that is, transmits, via the wireless communication device, an instruction of permitting transmission of sensor data to the vehicle-mounted device mounted in the vehicle selected by the vehicle selecting device, and an instruction of prohibiting transmission of sensor data to the vehicle-mounted device mounted in a vehicle not selected by the vehicle selecting device.

In the area satisfying the specific condition, a limited vehicle is selected and transmits sensor data to the traffic assistance server. Such a vehicle is selected so as to have a data transmission ability sufficient to manage and maintain the traffic status overview map in accordance with a line status. The other vehicles are prohibited from transmitting sensor data to the traffic assistance server. As a result, a situation can be prevented in which the server receives excessive sensor data in accordance with a change in the line status and in which the load on the server becomes excessive and the quality of the traffic status overview map is affected.

The vehicle selecting device may include an area selecting device that selects, from the traffic status overview map, an area satisfying either or both of a condition of a first-type area in which a predetermined number or more of dynamic objects are present within a certain range, and a condition of a second-type area in which a dynamic object having a specific attribute is present; and an effective vehicle selecting device that selects a vehicle having mounted therein a vehicle-mounted device capable of transmitting most effective sensor data for maintaining the traffic status overview map in accordance with a status of the area selected by the area selecting device and a line status, among vehicle-mounted devices present within the area.

A selected area needs to satisfy the specific condition. In accordance with the specific condition, a vehicle that transmits sensor data can be appropriately selected in each area in accordance with a line status. A different vehicle may be selected in a different status. As a result, a vehicle capable of transmitting appropriate sensor data to the traffic assistance server is permitted to transmit sensor data in accordance with the status of each area. Thus, concentration of excessive sensor data in the traffic assistance server is prevented, and appropriate data is transmitted to the traffic assistance server in accordance with the status of each area and a line status. As a result, the quality of the traffic status overview map can be kept high.

The traffic assistance server may further include a priority policy storage device that stores a plurality of sensor priority policies each indicating a priority with which sensor data is to be transmitted for maintaining the traffic status overview map in accordance with a condition of an area selected by the area selecting device and a line status; and a priority policy determining device that determines, for each of areas selected by the area selecting device, a sensor priority policy from among the priority policies stored in the priority policy storage device in accordance with a reason for which the area has been selected. The vehicle selecting device may include a selection-by-sensor-priority-policy device that selects, in accordance with the sensor priority policy determined by the priority policy determining device, a vehicle having mounted therein a vehicle-mounted device capable of transmitting sensor data conforming most to the sensor priority policy among vehicle-mounted devices present within the area selected by the area selecting device.

In a selected area, different types of sensor data may be important to manage and maintain the traffic status overview map depending on the reason for which the area has been selected and a line status. Thus, which sensor data is to be preferentially transmitted to the traffic assistance server in which area and line status is determined in advance as policies, an appropriate sensor priority policy is selected for each area, and a vehicle capable of transmitting effective data is permitted to transmit sensor data to the traffic assistance server in accordance with the selected sensor priority policy. In this way, it is possible to keep the quality of the traffic status overview map high while preventing the amount of sensor data transmitted to the traffic assistance server from becoming excessive in accordance with a change in the line status.

The second-type area may be any one of a child detection area in which presence of a child in the area has been detected, a dangerous object detection area in which presence of a dynamic object that takes a predetermined dangerous action in the area has been detected, an accident area in which occurrence of a vehicle accident in the area has been detected, and a disabled vehicle area in which presence of a disabled vehicle in the area has been detected.

A child often makes a quick movement and is a dangerous dynamic object for vehicles. Thus, in an area in which a child has been detected, it is important to detect position information of the dynamic object with high definition, not with a detailed image. The same applies to, for example, a pedestrian holding a smartphone in his/her hand. On the other hand, when a vehicle involved in an accident, a disabled vehicle, or the like is present on a road, it is not necessary to transmit the position thereof to the traffic assistance server with high definition because such a vehicle is less likely to move. Regarding such a vehicle involved in an accident or a disabled vehicle, the status around the vehicle involved in an accident or the disabled vehicle is accurately reported to the traffic assistance server if the status thereof is accurately transmitted to the traffic assistance server. As a result, the information of the traffic status overview map can be made accurate. Thus, concentration of sensor data in the traffic assistance server can be prevented.

The plurality of sensor priority policies may include a first policy of giving a higher priority to position data of a dynamic object than to attribute data of the dynamic object, and a second policy of giving a higher priority to attribute data of a dynamic object than to position data of the dynamic object. The priority policy determining device may select the first policy when the second-type area is the child detection area or the dangerous object detection area, and may select the second policy when the second-type area is the accident area or the disabled vehicle area.

In a case where the above-described sensor priority polices are adopted, a high priority is given to position data of a dynamic object when a dynamic object that moves often, such as a child, is detected, and a high priority is given to attribute data of a dynamic object when a dynamic object that does not move but whose detailed data is necessary, such as a vehicle involved in an accident, is detected. At the selection of a vehicle, a vehicle capable of transmitting data effective to the process of the traffic assistance server is selected in accordance with a sensor priority policy determined in this manner. As a result, it is possible to keep the accuracy of the traffic status overview map high while preventing a situation in which sensor data concentrates in the traffic assistance server and the load thereon becomes excessive.

In the traffic assistance system, the plurality of sensor priority policies may further include a third policy of equally handling position data and attribute data of a dynamic object. The priority policy determining device may select the third policy when the type is the child detection area or the dangerous object detection area and is the accident area or the disabled vehicle area.

The third sensor priority policy of similarly handing both position data and attribute data is prepared. As a result, even when it is difficult to determine which of the first sensor priority policy and the second sensor priority policy is to be adopted, a vehicle that transmits sensor data can be selected on the basis of a fixed policy.

The traffic assistance server may further include a determining device that, in response to selection of the accident area or the disabled vehicle area by the area selecting device, determines whether or not there is a vehicle that has mounted therein an imaging sensor whose detection range includes the area and that is capable of transmitting in real time video captured by the imaging sensor; a transmission instruction device that, in response to an affirmative determination made by the determining device, instructs the vehicle to transmit data of video captured by the imaging sensor, that is, instructs the vehicle determined to be capable of transmitting the video in real time by the determining device to transmit data of the video; and a buffering instruction device that, in response to a negative determination made by the determining device, selects a vehicle capable of transmitting highest-definition image data from among vehicles within the area, and transmits, via the wireless communication device, a buffering instruction to buffer image data and transmit the buffered image data to the traffic assistance server at a transmittable timing.

It may be difficult to transmit detailed sensor data to the traffic assistance server depending on a traffic status, for example, when a line status is unfavorable. Even in such a case, in an area in which a vehicle involved in an accident, a disabled vehicle, a fallen tree, a fallen object, or the like is present, the detailed status thereof may be transmitted to the traffic assistance server. However, such an object does not move and thus data representing the detailed status (for example, high-resolution image data) or the like need not necessarily be transmitted to the traffic assistance server in real time. Thus, when there is not a vehicle capable of performing real-time transmission, any of vehicles travelling nearby buffers sensor data of the surroundings and transmits the sensor data to the traffic assistance server when the line status improves. As a result, even when the line status is unfavorable, sensor data effective for the process of the traffic assistance server can be transmitted to the traffic assistance server.

Each of the plurality of vehicle-mounted devices may transmit, to the traffic assistance server, the sensor data and data indicating a detection range of the imaging sensor of the vehicle having mounted therein the vehicle-mounted device. The buffering instruction device may select a candidate vehicle having mounted therein an imaging sensor whose current or future detection range includes the area, on the basis of the data indicating the detection range transmitted from each of the vehicle-mounted devices, the road map data, and a travelling direction of the vehicle having mounted therein the vehicle-mounted device, and may instruct the vehicle to buffer image data and transmit the buffered image data to the traffic assistance server at a transmittable timing.

A vehicle that performs buffering may have a sensor that covers a target area. Thus, each vehicle transmits information capable of specifying the sensor detection range of the vehicle to the traffic assistance server. The traffic assistance server selects a candidate vehicle on the basis of the information. The buffered information indicates a status of a wide range of the target area, and the process of the traffic assistance server is performed more accurately.

The selection-by-sensor-priority-policy device may include an inquiring device that transmits, for each of areas selected by the area selecting device, to each of vehicle-mounted devices present within the area, an inquiry inquiring a transmission ability for sensor data transmittable to the traffic assistance server for maintaining the traffic status overview map, together with data indicating the determined sensor priority policy, via the wireless communication device; and a device that selects a vehicle having mounted therein a vehicle-mounted device that has transmitted a response indicating a highest transmission ability in response to the inquiry from the inquiring device.

The traffic assistance server transmits an inquiry about a transmission ability to vehicle-mounted devices, together with data indicating a determined sensor priority policy. Each vehicle-mounted device is capable of calculating the transmission ability for sensor data to be transmitted from the vehicle-mounted device to the traffic assistance server in accordance with the data indicating the sensor priority policy. At the time of calculation, a line speed, a degree of congestion of an intra-vehicle network, and a calculation resource are considered. As a result, it is possible to select a vehicle-mounted device capable of efficiently transmitting sensor data to the traffic assistance server in a method conforming to the sensor priority policy.

A traffic assistance method according to a fourth aspect of the present disclosure is a traffic assistance method implemented by a traffic assistance system including a plurality of vehicle-mounted devices each of which is mounted in one of a plurality of vehicles, each of the plurality of vehicles being equipped with a plurality of types of sensors each of which is capable of collecting data about a surrounding environment; and a traffic assistance server that collects data from the sensors to create a traffic status overview map representing a traffic status in a predetermined range and transmits data for driving assistance to the plurality of vehicle-mounted devices on the basis of the traffic status overview map, via wireless communication with each of the plurality of vehicle-mounted devices. The traffic assistance method includes, in each of the plurality of vehicle-mounted devices, a step of collecting sensor data which is data from the sensors equipped in the vehicle having mounted therein the vehicle-mounted device; a step of transmitting the sensor data to the traffic assistance server via wireless communication; a step of receiving data about an outside-vehicle status from an outside of the vehicle via wireless communication; and a step of, in response to receipt of the data about the outside-vehicle status, cooperating with a device outside the vehicle and changing an operation inside the vehicle including at least an operation of the step of transmitting the sensor data, and in the traffic assistance server, a step of receiving the sensor data from the plurality of vehicle-mounted devices via a wireless communication, creating the traffic status overview map on the basis of the received data and road map data, and maintaining the traffic status overview map; a step of selecting an area satisfying a specific condition from the traffic status overview map and selecting a vehicle having mounted therein a vehicle-mounted device capable of transmitting most effective sensor data for maintaining the traffic status overview map in view of a line status, among vehicle-mounted devices present within the area; and a step of transmitting, via wireless communication, an instruction of permitting the vehicle-mounted device mounted in the selected vehicle to transmit sensor data and prohibiting a vehicle-mounted device mounted in a vehicle not selected by the vehicle selecting device from transmitting sensor data, that is, transmitting, via wireless communication, an instruction of permitting transmission of sensor data to the vehicle-mounted device mounted in the selected vehicle, and an instruction of prohibiting transmission of sensor data to the vehicle-mounted device mounted in a vehicle not selected by the vehicle selecting device. The step of changing an operation inside the vehicle includes a step of, in response to receipt of the instruction, controlling the step of transmitting the sensor data in accordance with the instruction.

In the area satisfying the specific condition, a limited vehicle is selected and transmits sensor data to the traffic assistance server. Such a vehicle is selected so as to have a data transmission ability sufficient to manage and maintain the traffic status overview map in accordance with a line status. The other vehicles are prohibited from transmitting sensor data to the traffic assistance server. As a result, a situation can be prevented in which the server receives a large amount of sensor data and in which the load on the server becomes excessive in accordance with a change in the line status and the quality of the traffic status overview map is affected.

A method for operating a vehicle-mounted device according to a fifth aspect of the present disclosure is a method for operating a vehicle-mounted device in a traffic assistance system including a plurality of vehicle-mounted devices each of which is mounted in one of a plurality of vehicles, each of the plurality of vehicles being equipped with a plurality of types of sensors each of which is capable of collecting data about a surrounding environment; and a traffic assistance server that collects data from the sensors to create a traffic status overview map representing a traffic status in a predetermined range and transmits data for driving assistance to the plurality of vehicle-mounted devices on the basis of the traffic status overview map, via wireless communication with each of the plurality of vehicle-mounted devices. The method includes a step of collecting sensor data which is data from the sensors equipped in the vehicle having mounted therein the vehicle-mounted device; a step of transmitting the sensor data to the traffic assistance server via wireless communication; a step of receiving data about an outside-vehicle status from an outside of the vehicle via wireless communication; and a step of, in response to receipt of the data about the outside-vehicle status, cooperating with a device outside the vehicle and changing an operation inside the vehicle including at least an operation of the step of transmitting the sensor data. The step of changing an operation inside the vehicle includes a step of, in response to receipt of an instruction of permitting or prohibiting transmission of sensor data from the traffic assistance server, controlling the step of transmitting the sensor data in accordance with the instruction.

In an area satisfying a specific condition, the vehicle-mounted device of a limited vehicle is selected and transmits sensor data to the traffic assistance server. Such a vehicle is selected so as to have a data transmission ability sufficient to manage and maintain the traffic status overview map. The other vehicles are prohibited from transmitting sensor data to the traffic assistance server. As a result, a situation can be prevented in which the server receives excessive sensor data and in which the load on the server becomes excessive and the quality of the traffic status overview map is affected.

A method for operating a traffic assistance server according to a sixth aspect of the present disclosure is a method for operating a traffic assistance server used in a traffic assistance system including a plurality of vehicle-mounted devices each of which is mounted in one of a plurality of vehicles, each of the plurality of vehicles being equipped with a plurality of types of sensors each of which is capable of collecting data about a surrounding environment; and a traffic assistance server that collects sensor data which is data from the sensors to create a traffic status overview map representing a traffic status in a predetermined range and transmits data for driving assistance to the plurality of vehicle-mounted devices on the basis of the traffic status overview map, via wireless communication with each of the plurality of vehicle-mounted devices. The method includes a step of receiving the sensor data from the plurality of vehicle-mounted devices via wireless communication, creating the traffic status overview map on the basis of the received data and road map data, and maintaining the traffic status overview map; a step of selecting an area satisfying a specific condition from the traffic status overview map and selecting a vehicle having mounted therein a vehicle-mounted device capable of transmitting most effective sensor data for maintaining the traffic status overview map in view of a line status, among vehicle-mounted devices present within the area; and a step of transmitting, via wireless communication, an instruction of permitting the vehicle-mounted device mounted in the vehicle selected in the step of selecting the vehicle to transmit sensor data and prohibiting a vehicle-mounted device mounted in a vehicle not selected by the vehicle selecting device from transmitting sensor data, that is, transmitting, via wireless communication, an instruction of permitting transmission of sensor data to the vehicle-mounted device mounted in the vehicle selected in the step of selecting the vehicle, and an instruction of prohibiting transmission of sensor data to the vehicle-mounted device mounted in a vehicle not selected by the vehicle selecting device.

In the area satisfying the specific condition, a limited vehicle is selected and transmits sensor data to the traffic assistance server. Such a vehicle is selected so as to have a data transmission ability sufficient to manage and maintain the traffic status overview map in view of a line status. The other vehicles are prohibited from transmitting sensor data to the traffic assistance server. As a result, a situation can be prevented in which the server receives an excessive amount of sensor data and in which the load on the server becomes excessive in accordance with a change in the line status and the quality of the traffic status overview map is affected.

A computer program according to a seventh aspect of the present disclosure is a computer program that causes a computer to operate as a vehicle-mounted device in a traffic assistance system including a plurality of vehicle-mounted devices each of which is mounted in one of a plurality of vehicles, each of the plurality of vehicles being equipped with a plurality of types of sensors each of which is capable of collecting data about a surrounding environment; and a traffic assistance server that collects data from the sensors to create a traffic status overview map representing a traffic status in a predetermined range and transmits data for driving assistance to the plurality of vehicle-mounted devices on the basis of the traffic status overview map, via wireless communication with each of the plurality of vehicle-mounted devices. The computer program includes a step of collecting, by the computer, sensor data which is data from the sensors equipped in the vehicle having mounted therein the vehicle-mounted device; a step of transmitting, by the computer, the sensor data to the traffic assistance server via wireless communication; a step of receiving, by the computer, data about an outside-vehicle status from an outside of the vehicle via wireless communication; and a step of, in response to receipt of the data about the outside-vehicle status, cooperating, by the computer, with a device outside the vehicle and changing, by the computer, an operation inside the vehicle including at least an operation of the step of transmitting the sensor data. The step of changing an operation inside the vehicle includes a step of, in response to receipt of an instruction of permitting or prohibiting transmission of sensor data from the traffic assistance server, controlling, by the computer, the step of transmitting the sensor data in accordance with the instruction.

In an area satisfying a specific condition, only a limited vehicle is selected and transmits sensor data to the traffic assistance server. Such a vehicle is selected so as to have a data transmission ability sufficient to manage and maintain the traffic status overview map. The other vehicles are prohibited from transmitting sensor data to the traffic assistance server. As a result, a situation can be prevented in which the server receives excessive sensor data and in which the load on the server becomes excessive and the quality of the traffic status overview map is affected.

A recording medium according to an eighth aspect of the present disclosure is a recording medium having recorded thereon the above-described computer program.

An advantage similar to that of the computer program according to the seventh aspect can be obtained.

A computer according to a ninth aspect of the present disclosure is a computer programmed with the above-described computer program.

An advantage similar to that of the computer program according to the seventh aspect can be obtained.

A semiconductor integrated circuit according to a tenth aspect of the present disclosure is a semiconductor integrated circuit having implemented therein the above-described computer.

An advantage similar to that of the computer according to the ninth aspect can be obtained.

A semiconductor integrated circuit according to an eleventh aspect is programmed to function as an inside-vehicle/outside-vehicle cooperation device that is mounted in a vehicle and that is for causing a functional unit in the vehicle to operate in cooperation with an outside of the vehicle. The semiconductor integrated circuit is programmed to execute a method including a step of collecting sensor data which is data from a sensor equipped in the vehicle; a step of transmitting the sensor data to an external device via wireless communication; a step of receiving data about a status outside the vehicle and an instruction for the vehicle from the external device via wireless communication; a step of, in response to receipt of the data about the status outside the vehicle, distributing the data to the functional unit; and a step of, in response to the instruction, changing a process in either or both of the step of collecting the sensor data and the step of transmitting the sensor data.

According to this semiconductor integrated circuit, the functional unit of the vehicle can be controlled in cooperation between the functional unit in the vehicle and a device outside the vehicle. By changing the process in the step of collecting sensor data or the step of transmitting sensor data, data responding to an instruction from an external device can be transmitted to the external device. As a result, with use of the sensor data from the vehicle having mounted therein the semiconductor integrated circuit, the external device is capable of transmitting, to the semiconductor integrated circuit, data effective to cause the individual units of the vehicle to function.

Advantages Effects of Present Disclosure

As described above, according to the present disclosure, it is possible to provide a traffic assistance system, server, and method, a vehicle-mounted device and a method for operating the same, a computer program, a recording medium, a computer, and a semiconductor integrated circuit that are capable of maintaining the quality of a traffic status overview map while preventing a load on a server from becoming excessive.

First Embodiment

<Configuration>
<<Overall Configuration>>

Figure 3:
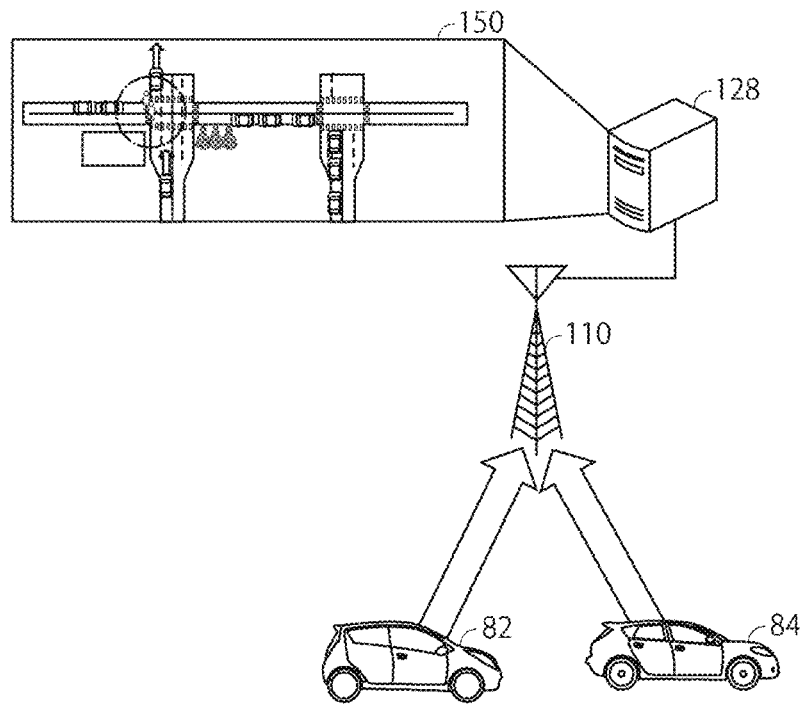
FIG. 3 is a diagram illustrating the schematic configuration of a traffic assistance system according to a first embodiment of the present disclosure.

FIG. 3 is a schematic configuration diagram of a traffic assistance system according to the present disclosure. Referring to FIG. 3, this traffic assistance system includes, like the system described in PTL 1, vehicles 82 and 84, an infrastructure sensor that is not illustrated, a mobile phone or the like carried by a pedestrian that is not illustrated, and an edge server 128 serving as a traffic assistance server that communicates with the vehicles, the infrastructure sensor, and the mobile phone via a base station 110 and that performs a process of constructing and maintaining a traffic status overview map 150.

<<Vehicle-Mounted Device>>

Figure 4:
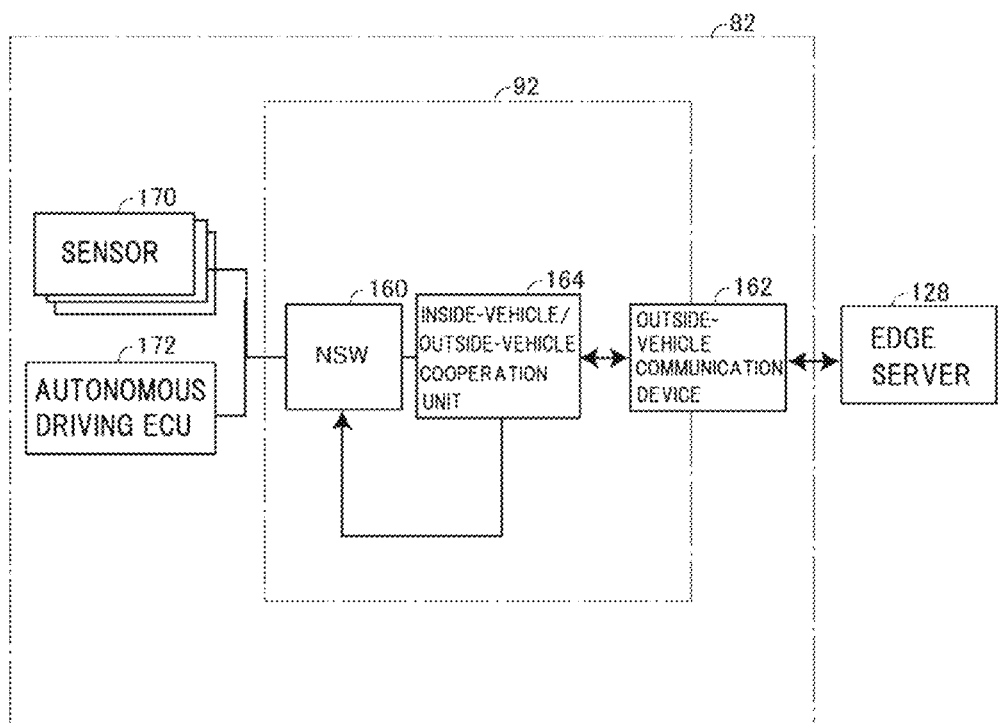
FIG. 4 is a block diagram illustrating the configuration of elements related to the traffic assistance system in a vehicle.

Referring to FIG. 4, the vehicle 82 includes various types of sensors 170, an autonomous driving electronic control unit (ECU) 172 for vehicle control, a vehicle-mounted device 92 for collecting sensor data from these sensors 170 and controlling the ECU 172 while communicating with the ECU 172, and an outside-vehicle communication device 162 used by the vehicle-mounted device 92 to communicate with elements outside the vehicle, such as the edge server 128 and another vehicle.

The vehicle-mounted device 92 includes a network switch (NSW) 160 connected to the sensors 170, the ECU 172, and so forth; and an inside-vehicle/outside-vehicle cooperation unit 164 that is connected to the sensors 170 and the ECU 172 via the NSW 160 and that is for transmitting sensor data from the sensors 170 to the outside via the outside-vehicle communication device 162 and controlling the operation state of the ECU 172 and so forth by using a combination of information collected from the in-vehicle sensors and so forth and data received from the outside via the outside-vehicle communication device 162. The inside-vehicle/outside-vehicle cooperation unit 164 controls the process of collecting sensor data and the process of transmitting sensor data to the outside in response to an instruction from the edge server 128, as will be described below. In the present embodiment, the vehicle-mounted device 92 includes only the NSW 160 and the inside-vehicle/outside-vehicle cooperation unit 164. Alternatively, the vehicle-mounted device 92 may be a single vehicle-mounted device including the ECU 172 or the outside-vehicle communication device 162, or both of them. The vehicle-mounted device 92 may be implemented as a device in which a semiconductor integrated circuit, such as an application specific integrated circuit (ASIC) or system large scale integration (LSI), or a plurality of semiconductor integrated circuits are mounted on a substrate.

<<Traffic Assistance Server>>

Figure 5:
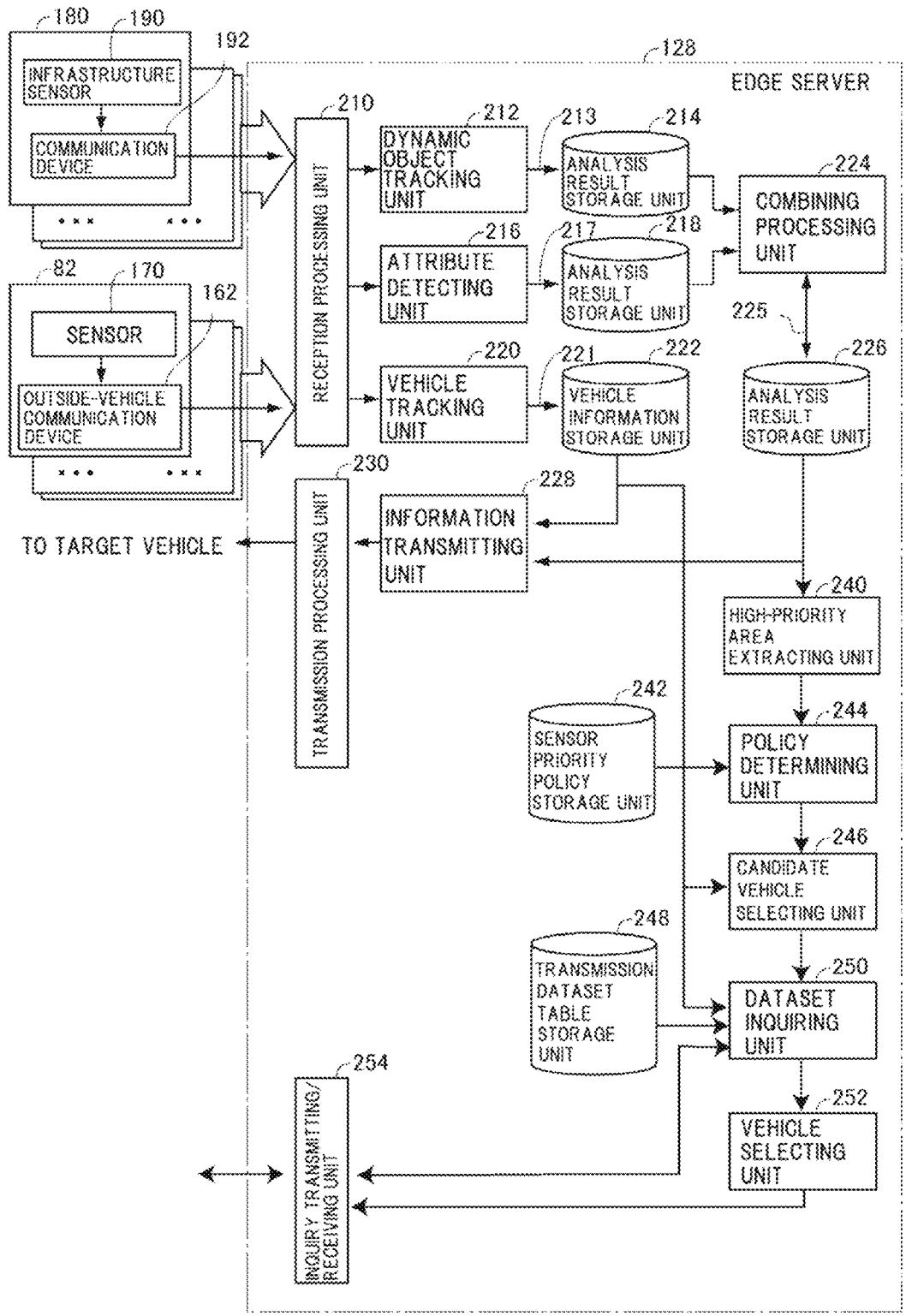
FIG. 5 is a block diagram illustrating the configuration of an edge server which is a traffic assistance server according to the first embodiment of the present disclosure.

Referring to FIG. 5, the edge server 128 includes a reception processing unit 210 for receiving signals from a plurality of infrastructure sensor facilities 180 (including either or both of a camera and a LiDAR) and signals from the sensors 170 (including either or both of a camera and a LiDAR) mounted in the vehicle 82 as described above. Each of the infrastructure sensor facilities 180 includes an infrastructure sensor 190 composed of a camera or a LiDAR, and a communication device 192 for transmitting a signal output from the infrastructure sensor 190 to the reception processing unit 210 of the edge server 128. Likewise, the vehicle 82 includes the sensor 170 composed of a camera or a LiDAR, and the outside-vehicle communication device 162 that transmits a signal output from the sensor 170 toward the reception processing unit 210 of the edge server 128.

The edge server 128 further includes a dynamic object tracking unit 212 that analyzes distance measurement signals from a LiDAR or the like among signals received by the reception processing unit 210 to determine and track the positions of individual dynamic objects in a first period; a first analysis result storage unit 214 for storing an analysis result 213 of the dynamic object tracking unit 212; and an attribute detecting unit 216 that performs image analysis on an image signal from a camera among signals received by the reception processing unit 210 to determine the attribute and position of a dynamic object in an image, such as a vehicle or a human, in a second period. The edge server 128 further includes a second analysis result storage unit 218 for storing an analysis result 217 of the attribute detecting unit 216; a combining processing unit 224 that repeatedly combines, in a period shorter than the second period, the analysis result 213 stored in the analysis result storage unit 214 and the analysis result 217 stored in the analysis result storage unit 218 and that outputs a traffic status overview map 225, which is an analysis result obtained through the combining; and a third analysis result storage unit 226 that accumulates and stores the traffic status overview map 225 output from the combining processing unit 224.

The analysis results 213, 217, and 225 are each calculated at a predetermined time interval. Analysis results calculated in certain past times are also accumulated and stored as histories in the analysis result storage units 214, 218, and 226. When performing a combining process, the combining processing unit 224 may refer to the history of the traffic status overview map 225, which is a past combining analysis result accumulated in the analysis result storage unit 226.

The edge server 128 further includes a vehicle tracking unit 220 for obtaining, on the basis signals received by the reception processing unit 210 from individual vehicles, vehicle information made up of the positions, speeds, moving directions, and so forth of the vehicles to be managed; and a vehicle information storage unit 222 for storing vehicle information 221, such as the positions, speeds, moving directions, and so forth of individual vehicles, analyzed by the vehicle tracking unit 220. The edge server 128 further includes an information transmitting unit 228 that performs a process of, for example, comparing dynamic object information in the traffic status overview map 225 with the vehicle information 221 and providing traffic assistance information in combined dynamic object information, for example, information about a dynamic object having an attribute supposed to be dangerous, such as a child or a pedestrian who uses a smartphone while walking, or information about a vehicle involved in an accident, a disabled vehicle, or a fallen object on a road, to a vehicle located within a predetermined range from the object; and a transmission processing unit 230 for transmitting an information notification signal from the information transmitting unit 228 to the target vehicle.

The edge server 128 further includes a high-priority area extracting unit 240 for extracting, on the basis of the traffic status overview map stored in the analysis result storage unit 226, the coordinates specifying a high-priority area for preferentially collecting sensor data. The high-priority area to be extracted by the high-priority area extracting unit 240 is, for example, an area in which the number of dynamic objects present in the area is greater than or equal to a predetermined threshold, an area in which a dynamic object having an attribute that is likely to take a dangerous action, such as a child, has been detected, or the like. For example, the high-priority area extracting unit 240 divides a road map into predetermined sections and determines, for each section, whether or not the section satisfies the above-described condition, thereby extracting a high-priority area. To detect an area including dynamic objects the number of which is greater than or equal to the threshold, a plurality of areas to be focused on (for example, intersections or the like) may be determined in advance on the road map, and whether or not the condition is satisfied may be examined for only these areas.

The edge server 128 further includes a sensor priority policy storage unit 242 that stores a plurality of sensor priority policies, which will be described below; a policy determining unit 244 that determines, for each of areas extracted by the high-priority area extracting unit 240, which of the sensor priority policies stored in the sensor priority policy storage unit 242 is to be applied in accordance with the status of the extracted area; and a candidate vehicle selecting unit 246 that selects, for each of the areas extracted by the high-priority area extracting unit 240, a vehicle whose sensor detection range includes the area as a candidate vehicle that transmits sensor data to the edge server 128. In the present embodiment, it is assumed that each vehicle transmits sensor data to the edge server 128 in an area other than a high-priority area and that the vehicle transmits, as vehicle information, the coordinates specifying the sensor detection range of the vehicle (the coordinates relative to a basic position of the vehicle) at that time. With use of these coordinates and the coordinates of the basic positions of the vehicles, the absolute coordinates of the range detectable by the sensor of each vehicle are calculated, and the coordinates are compared with the coordinates of each area. Accordingly, a candidate vehicle can be selected.

The edge server 128 further includes a dataset inquiring unit 250 for transmitting a sensor priority policy determined by the policy determining unit 244 for each of candidate vehicles selected by the candidate vehicle selecting unit 246 and inquiring a transmission sensor dataset that can be transmitted to the edge server 128 by each vehicle in accordance with the sensor priority policy; a vehicle selecting unit 252 that, in accordance with responses obtained from the individual candidate vehicles to the inquiries from the dataset inquiring unit 250, selects a vehicle capable of transmitting the most efficient sensor data for creating a traffic status overview map by the edge server 128, permits only the selected vehicle to transmit sensor data, and prohibits the other vehicles in the same area from transmitting sensor data, in other words, transmits an instruction of permitting transmission of sensor data to the selected vehicle and transmits an instruction of prohibiting transmission of sensor data to the other vehicles in the same area; and an inquiry transmitting/receiving unit 254 for performing wireless communication between the dataset inquiring unit 250 and individual vehicles and between the vehicle selecting unit 252 and the individual vehicles. Here, a vehicle capable of transmitting the most efficient sensor data for creating a traffic status overview map by using a transmitted sensor priority policy is referred to as a vehicle conforming most to the sensor priority policy.

Regarding transmitting of the most effective sensor data for creating a traffic status overview map, various standards can be considered from the viewpoint of a designer. For example, a standard may be that the most important data from the viewpoint of driving assistance for a traffic participant, that is, data that contributes to prevention of accidents, is transmitted to the edge server 128 at a sufficient transmission speed. From another point of view, a standard may be that sensor data is transmitted to the edge server 128 so that the content of the traffic status overview map can follow actual changes accurately as much as possible and at a sufficient speed. In this case, it may be important that the traffic status overview map is divided into several areas, the degree of importance varies among the areas, and a change in an important area can be reflected in the traffic status overview map at a higher follow-up speed than that for a change in the other areas. In short, satisfying of a standard defined so that data that is effective from the viewpoint that the system designer places the highest importance to maintain and manage the traffic status overview map can be transmitted to the edge server 128 and so that a load in the edge server 128 can be prevented from being excessive corresponds to transmitting "the most effective sensor data most efficiently" to the edge server 128.

In FIG. 5, the inquiry transmitting/receiving unit 254 may use the same hardware as the reception processing unit 210 and the transmission processing unit 230. Conformance to a sensor priority policy may be quantitatively determined, but in the present embodiment a determination is made by using a transmission dataset table corresponding to each sensor priority policy in advance, as will be described below. The transmission dataset table may be created by using a subjective standard, or may be created by setting a certain formula on the basis of various factors, such as a line speed, the number of high-priority areas focused on in the traffic status overview map, the positions of vehicles in the areas, the abilities of transmission facilities of the respective vehicles, and the number of dynamic objects present in the areas, and comparing values obtained by applying these factors to the formula. Actually, however, it is practical to use a method using a transmission dataset table, which will be described below.

In the present embodiment, the dataset inquiring unit 250 distributes a transmission dataset table to individual vehicles. The transmission dataset table lists, in accordance with transmission abilities, the configurations in which the individual vehicles are capable of performing transmission regarding the amount of sensor data (definition or resolution) and the data transmission interval of, for example, a LiDAR and a camera among the sensors equipped in the vehicles. The dataset inquiring unit 250 receives information indicating which items of data in the transmission dataset table can be transmitted by the individual vehicles (identification information of the items). As a result of receiving the identification information of the items, it is possible to determine the levels of the sensor data transmission abilities of the individual vehicles. However, the sensors mounted in the individual vehicles are different from each other in manufacturer, and the specifications are not uniform among products. Thus, a transmission dataset table is prepared in the edge server 128, the transmission dataset table listing the data definitions and data transmission intervals of all products of all manufacturers and listing the products in descending order of total transmission ability, and the transmission dataset table is distributed to the individual vehicles. Each vehicle transmits to the edge server 128 identification information of the item corresponding to the highest transmission ability with which the vehicle is capable of performing transmission in the transmission dataset table. Accordingly, the sensor data transmission abilities of the individual vehicles can be compared with each other regardless of manufacturers and products. An example of the transmission dataset table is illustrated in FIG. 6.

The policy determining unit 244 in FIG. 5 determines a sensor priority policy in accordance with the property of each area. The sensor priority policy determines the type of sensor that outputs sensor data to which priority is to be given among pieces of sensor data. For example, it is assumed that the presence of a child in a certain area is detected. Such an area is referred to as a child detection area herein. A child may suddenly take an unpredictable action unlike an adult. Thus, it is necessary in the child detection area to highly frequently acquire information about the position of a detected dynamic object. Thus, it is necessary to transmit to the edge server 128 sensor data from a sensor capable of detecting the position of a dynamic object at high speed, such as a LiDAR, preferentially over sensor data from a sensor having difficulty or taking time in detecting the position of a dynamic object, such as a camera. On the other hand, for example, an area in which a vehicle involved in an accident is present on a road is assumed. Such an area is referred to as an accident area herein. Typically, a vehicle involved in an accident does not move, and thus it is not necessary to highly frequently transmit the coordinates of the position thereof to the edge server 128. On the other hand, to let the drivers of individual vehicles know the situation of the accident, distributing of an image captured by a camera makes it easier for the drivers to grasp the situation. Thus, in such an area, it is desired to give higher priority to the camera than to the LiDAR. In view of such a situation, the transmission dataset table to be used may be changed depending on the sensor priority policy that is adopted. Each vehicle or infrastructure sensor may have, as sensors, at least a sensor that detects the position of an object, such as a LiDAR, and a sensor that captures an image, such as a camera. In the present embodiment, an intersection or the like where many dynamic objects are present, and an area in which a child is present or the like are extracted as high-priority areas of the same level. However, the present disclosure is not limited to such an embodiment. An intersection or the like is a rather wide area, whereas an area in which a child is detected or the like is a small area, and both the areas are different in characteristics. Thus, only any one them may be extracted. Alternatively, a wide area may be extracted first, and then a small area may be extracted from the wide area.

Accordingly, in the present embodiment, a plurality of transmission dataset tables conforming to specific priority policies are prepared, and one of the transmission dataset tables is transmitted to each vehicle in accordance with the sensor priority policy determined by the policy determining unit 244. For this purpose, the edge server 128 further includes a transmission dataset table storage unit 248 storing in advance the plurality of transmission dataset tables. At the time of inquiring of each vehicle, the dataset inquiring unit 250 selects an appropriate transmission dataset table in accordance with the property of the area to which the vehicle belongs (a child detection area or an accident area) and transmits data representing the sensor priority policy selected for the area to the vehicle.

Image sensors such as cameras and distance measurement sensors such as LiDARs are different from each other in definition (resolution) depending on the specifications of products. Thus, it is necessary to prepare transmission dataset tables conforming to the individual sensor priority policies by sufficiently considering the type of target sensor, the definition of sensor data, and the transmission interval.

FIG. 6 illustrates an example of the transmission dataset tables stored in the transmission dataset table storage unit 248. Referring to FIG. 6, the transmission dataset table storage unit 248 stores transmission dataset tables 270, 272, . . . , and 274. These tables are related to a child detection area, an accident area, and so forth, as described above. The transmission dataset table 274 is a default transmission dataset table. The default table is used when a target area is not any of the areas. The default table is prepared so that one is not given higher priority than another regardless of the type of sensor. That is, the default transmission dataset table can be considered as data indicating a default sensor priority policy.

A child detection area and an accident area have been described above as properties of areas, but the properties of areas are not limited thereto. For example, attention needs to be paid to an adult operating a smartphone as well as a child. The same applies to a case where a bicycle ridden by two or three people is detected. Furthermore, examples of an area in which a camera image is given priority include an area in which many parked vehicles are present, an area of long-duration traffic congestion, an area in which a disabled vehicle is parked at a location where no vehicle is usually parked (disabled vehicle area), and so forth.

In the transmission dataset table 270 illustrated in FIG. 6, identification information (ID) is incremented by one from 0. As the value increases, the sensor data transmission ability increases.

When receiving the inquiry, a vehicle detects an available line speed, the degree of network congestion in the vehicle, the degree of tightness of resources of a CPU mounted in the vehicle-mounted device, and so forth, uses them to calculate an item in which the sensor data of the type designated in each item can be transmitted at the data transmission interval designated in the item among the items in the transmission dataset table received from the edge server 128, and notifies the edge server 128 of the identifier of the item. In this specification, a "line" means a wireless communication line for an external device.

In the example illustrated in FIG. 6, for example, when the identifier is 0, the sensor data to be transmitted is only LiDAR, and the data transmission interval thereof is 5 fps. When the identifier is 5, the sensor data to be transmitted includes LiDAR and video data of a full HD image camera, and the data transmission intervals thereof are 10 fps and 3 fps, respectively. When the identifier is 7, the sensor data to be transmitted includes LiDAR and video data of a full HD image camera, and the data transmission intervals thereof are both 10 fps.

<<Program Implementing Edge Server 128>>

Figure 7:
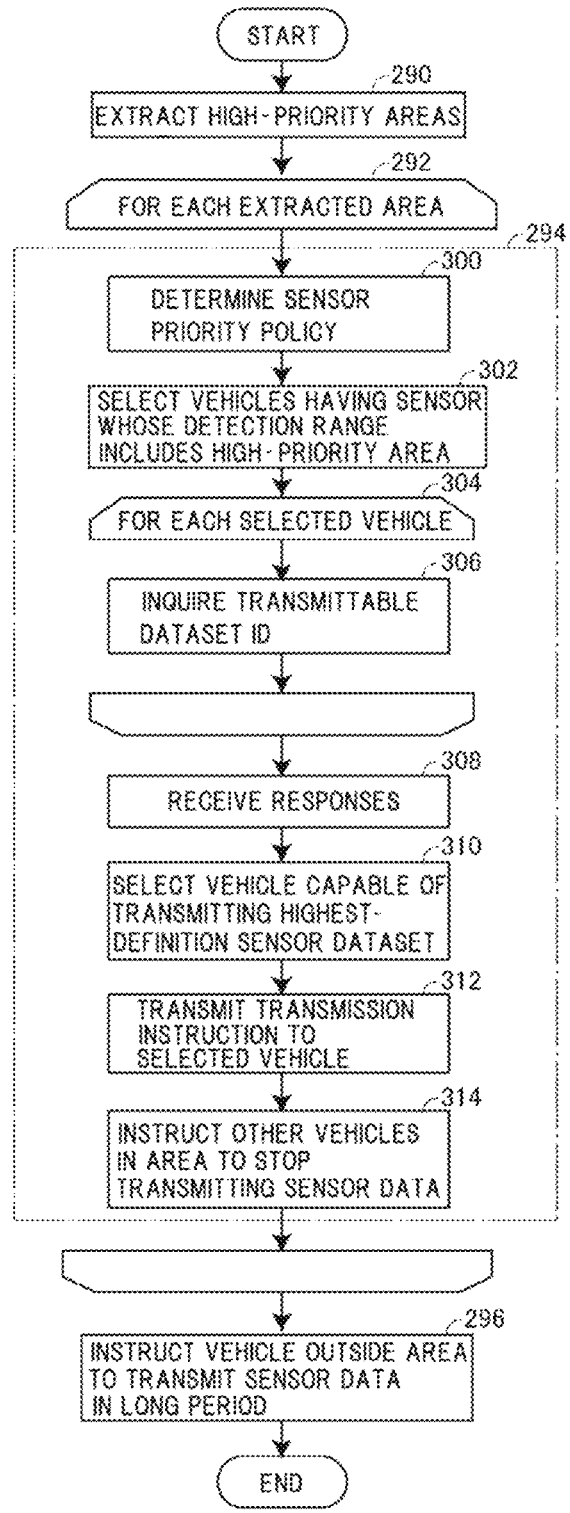
FIG. 7 is a flowchart illustrating the control structure of a program for controlling communication from a vehicle, the program being executed by the traffic assistance server according to the first embodiment of the present disclosure.

FIG. 7 illustrates, in the form of a flowchart, the control structure of a program that implements, by a computer, a process of permitting transmission of sensor data from a specific vehicle in each of the above-described areas and prohibiting transmission of sensor data from the other vehicles in the edge server 128, that is, a process of transmitting an instruction of permitting transmission of sensor data to a specific vehicle and transmitting an instruction of prohibiting transmission of sensor data to the other vehicles. This program runs at a certain time interval in parallel with a program of creating a traffic status overview map.

Referring to FIG. 7, this program includes step 290 of extracting high-priority areas from among the areas covered by the edge server 128 in accordance with the above-described standard; step 292 of executing a subsequent process 294 for each area extracted in step 290; and step 296 of, after the termination of step 292, instructing a vehicle that is not present in any high-priority area to transmit sensor data in a period longer than the period in which a vehicle transmits sensor data from within a high-priority area (including the case of stopping transmission), and finishing the execution of the program.

Process 294 includes step 300 of determining a sensor priority policy corresponding to the property of the area as a processing target; step 302 of calculating, by using data transmitted from vehicles present within the area as the processing target, the sensor detection ranges of the vehicles, and selecting, as candidate vehicles, vehicles that have mounted therein a predetermined sensor and whose sensor detection range includes the area as the processing target or whose sensor detection range is likely to include the area as the processing target in the near future on the basis the movement speeds and directions of the vehicles; step 304 of executing, for each vehicle selected in step 302, a process 306 of transmitting an inquiry about a transmittable dataset identifier together with a transmission dataset table selected in accordance with the sensor priority policy determined in step 300; and step 308 of receiving responses to the inquiry transmitted to the individual vehicles in step 304. Step 308 executes a process of excluding, from the candidate vehicles, a vehicle that does not respond within a certain time period from the transmission of the inquiry.

Process 294 further includes step 310 of selecting a vehicle capable of transmitting the highest-definition transmission sensor dataset on the basis of the responses from the individual vehicles received in step 308. In other words, in step 310, the vehicle whose response includes an identifier having the largest value is selected. In a case where there are a plurality of vehicles whose responses include the same identifier, the vehicles are narrowed down to a predetermined number (for example, one) by using a standard, for example, by randomly selecting a vehicle from among the vehicles, by selecting a vehicle having the largest number of types of sensors mounted therein, or by selecting a vehicle whose line speed is highest and whose round trip time (RTT, the time from when a signal is transmitted to when a response is received) is the shortest.

Process 294 further includes step 312, following step 310, of transmitting an instruction to transmit sensor data to the vehicle selected in step 310; and step 314, following step 312, of transmitting an instruction to stop transmitting sensor data to the vehicles that are present in the area as the processing target and that are different from the vehicle selected in step 310, and finishing the execution of process 294.

<<Program Implementing Inside-vehicle/Outside-vehicle Cooperation Unit 164>>

Figure 8:
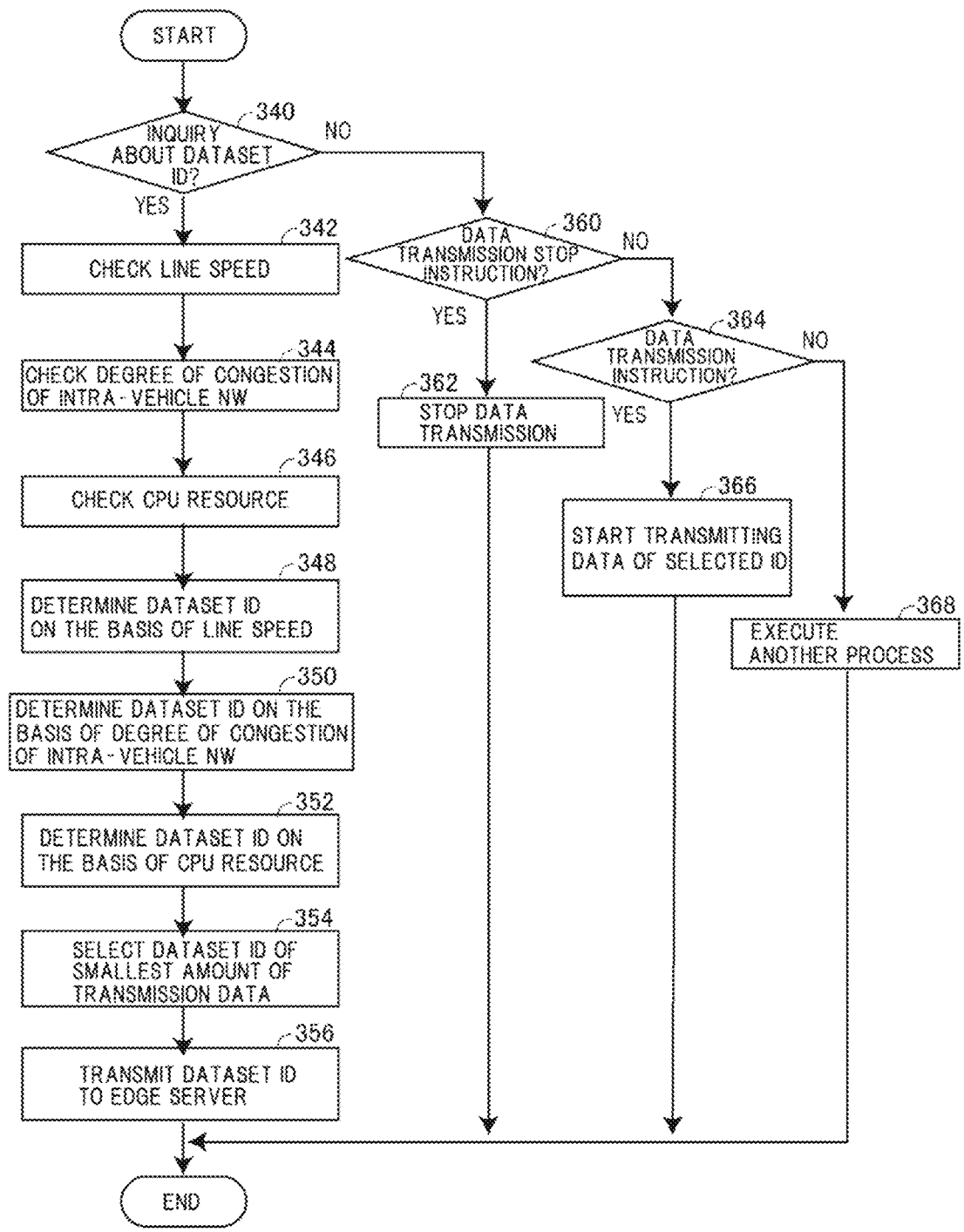
FIG. 8 is a flowchart illustrating the control structure of a program for controlling transmission of sensor data, the program being executed by a vehicle-mounted device in the traffic assistance system.

Referring to FIG. 8, a program for implementing the inside-vehicle/outside-vehicle cooperation unit 164 illustrated in FIG. 4 by a computer is executed when the inside-vehicle/outside-vehicle cooperation unit 164 receives an event. This program includes step 340 of determining whether or not a received event is an inquiry about a dataset ID and causing the flow of control to branch off in accordance with the determination; step 342 of checking the line speed available to the inside-vehicle/outside-vehicle cooperation unit 164 if the determination in step 340 is affirmative; step 344 of checking the degree of congestion of the intra-vehicle network; and step 346 of checking the resource available to the CPU mounted in the inside-vehicle/outside-vehicle cooperation unit 164. The line speed is the line speed of wireless communication used by the outside-vehicle communication device 162 in FIG. 4. The degree of congestion of the intra-vehicle network means the degree of congestion of the intra-vehicle network used for mutual communication among the sensors 170, the ECU 172, and the inside-vehicle/outside-vehicle cooperation unit 164 in FIG. 4. The resource of the CPU is an available resource of the CPU mounted in the inside-vehicle/outside-vehicle cooperation unit 164 illustrated in FIG. 4 or the resource available to the CPU mounted in every ECU related to a sensor data transmission process that is performed in response to an instruction from the server. Because the inside-vehicle/outside-vehicle cooperation unit 164 performs vehicle control, the intra-vehicle network and the CPU resource need to have some margins for vehicle control. Regarding the line speed and the intra-vehicle network, the states thereof can be easily checked, and the influences thereof on transmission of sensor data can be easily estimated. However, the CPU resource is susceptible to another process, and the state thereof can be clearly determined only after transmission of sensor data has actually been started, and thus it is difficult to estimate the CPU resource compared to the other two elements. Thus, processes of transmitting sensor data may be executed under various conditions, the CPU resource consumed accordingly may be actually measured, and the measurement results may be held in the form of a table or the like.

This program further includes step 348, following step 346, of determining the identifier of a transmittable maximum-level item in the sensor dataset transmitted from the edge server 128 on the basis of the line speed checked in step 342; step 350 of determining the identifier of a transmittable maximum-level item in the sensor dataset transmitted from the edge server 128 on the basis of the degree of congestion of the intra-vehicle network checked in step 344; step 352 of determining the identifier of a transmittable maximum-level item in the sensor dataset transmitted from the edge server 128 on the basis of the CPU resource checked in step 346; step 354 of selecting the smallest dataset identifier among the dataset identifiers respectively determined in steps 348, 350, and 352; and step 356 of transmitting the dataset ID selected in step 354 to the edge server 128 and finishing the process.

This program further includes step 360 of, if the determination in step 340 is negative, determining whether or not the received event is a sensor data transmission stop instruction from the edge server 128 and causing the flow of control to branch off in accordance with the determination; step 360 of, if the determination in step 360 is affirmative, stopping sensor data transmission in accordance with the instruction from the edge server 128 and finishing the execution of this program; step 364 of, if the determination in step 362 is negative, determining whether or not the received event is a data transmission instruction, that is, an instruction of permitting transmission, from the edge server 128, and causing the flow of control to branch off in accordance with the determination result; and step 366 of, if the determination in step 364 is affirmative, starting a process of transmitting to the edge server 128 the sensor data of the type determined by the dataset ID selected in step 354 and transmitted to the edge server 128 in step 356 in response to receipt of the inquiry from the edge server 128 at the data transmission interval determined by the ID, and finishing the execution of this program.

The process of transmitting data is executed separately from the process illustrated in FIG. 8. In step 362, the data transmission process is stopped. In step 366, the data transmission process is started.

This program further includes step 368 of, if the determination in step 364 is negative, appropriately executing another process in accordance with the received event and finishing the execution of this program.

<Operation>

The above-described edge server 128 and inside-vehicle/outside vehicle cooperation unit 164 operate in the following manner. Referring to FIG. 5, the infrastructure sensor facilities 180 and the sensors 170 each output sensor data corresponding to surrounding circumstances. These pieces of sensor data are transmitted to the edge server 128 via the communication devices 192 or the outside-vehicle communication devices 162. Among the sensors, LiDARs each measure the distance to a dynamic object present within a surrounding predetermined range and output a distance measurement signal as sensor data. Cameras each capture images of an imaging range at a predetermined frame rate. The series of images are transmitted to the edge server 128.

The reception processing unit 210 of the edge server 128 receives the signals from the plurality of infrastructure sensor facilities 180 and the signals from the sensors 170 mounted in the vehicle 82, as described above, gives the signals from LiDARs to the dynamic object tracking unit 212, and gives the image signals from cameras to the attribute detecting unit 216. On the other hand, the reception processing unit 210 gives the vehicle tracking unit 220 information indicating the positions, speeds, and travelling directions of vehicles in the information received from the sensors 170. On the basis of the received information, the vehicle tracking unit 220 maintains data indicating the current positions and moving directions of the individual vehicles. Each vehicle transmits to the edge server 128 coordinate data representing the detection range of the sensors mounted in the vehicle. The vehicle information storage unit 222 stores such information together with the coordinate positions of the individual vehicles.

The dynamic object tracking unit 212 of the edge server 128 analyzes the distance measurement signals from LiDARs or the like received from the reception processing unit 210, thereby determining the positions of individual dynamic objects in a first period. The time taken for the analysis is short, and the analysis result 213 is updated in the first period. The attribute detecting unit 216 performs image analysis on an image signal received from the reception processing unit 210, thereby determining the attribute and position of a dynamic object, such as a vehicle or a human, in the image. The image processing takes a longer time, and thus the period of attribute detection by the attribute detecting unit 216 is a second period, which is longer than the period of updating the analysis result 213 by the dynamic object tracking unit 212. The analysis result 217 of the attribute detecting unit 216 is stored in the analysis result storage unit 218.

The combining processing unit 224 generates the traffic status overview map 225 in a certain period on the basis of a road map stored in a storage device that is not illustrated and the analysis results stored in the first analysis result storage unit 214 and the analysis result storage unit 218, and updates the traffic status overview map stored in the third analysis result storage unit 226. When information to be transmitted to individual vehicles arises in the traffic status overview map 225, the information transmitting unit 228 generates information to be transmitted to the individual vehicles from the third analysis result storage unit 226 and transmits the information via the transmission processing unit 230.

The high-priority area extracting unit 240, the combining processing unit 224, the candidate vehicle selecting unit 246, the dataset inquiring unit 250, and the vehicle selecting unit 252 operate in the following manner. Referring to FIG. 7, the following process is repeated in a certain period.

First, the edge server 128 extracts high-priority areas from among the areas covered by the edge server 128 in accordance with the above-described standard. Subsequently, for each area extracted in step 290, the following process 294 is executed in step 292.

In process 294, a sensor priority policy is determined in accordance with the property of the area as the processing target (step 300). Subsequently, in step 302, the sensor detection ranges of vehicles present within the area as the processing target are calculated on the basis of data transmitted from the vehicles, it is determined whether each of the vehicles is a vehicle having mounted therein a predetermined sensor and having a sensor detection range including the area as the processing target or a sensor detection range that is likely to include the area as the processing target in the near future on the basis the movement speed and direction of the vehicle, and a vehicle satisfying the condition is selected as a candidate vehicle. In the following step 304, for each vehicle selected in step 302, a transmission dataset table is selected in accordance with the sensor priority policy determined in step 300, and an inquiry about a transmittable dataset identifier is transmitted together with the transmission dataset table in process 306. In response to this, as will be described below with reference to FIG. 8, a vehicle that has received the inquiry determines a dataset ID in the process including step 354 at the end in FIG. 8, and transmits the ID to the edge server 128 in step 356.

Referring to FIG. 7, the edge server 128 receives, in step 308, a response to the inquiry transmitted to each vehicle in step 304. A vehicle from which a response is not received within a certain time period from the transmission of the inquiry is excluded from the candidate vehicles.

Furthermore, in step 310, the edge server 128 selects a vehicle capable of transmitting the highest-definition sensor dataset on the basis of the responses received from the individual vehicles in step 308. In short, a vehicle whose response includes an identifier having the largest value is selected here. Furthermore, in step 312, the edge server 128 transmits a sensor data transmission instruction to the vehicle selected in step 310 and, in step 314, the edge server 128 transmits an instruction to stop transmitting sensor data to a vehicle that is present in the same area and that is other than the vehicle selected in step 310, and finishes the execution of process 294.

<<Operation of Inside-Vehicle/Outside-Vehicle Cooperation Unit 164>>

Referring to FIG. 8, the inside-vehicle/outside-vehicle cooperation unit 164 operates in the following manner. Typically, when an event occurs, a process is executed in the order of step 340, step 360, step 364, and step 368 in FIG. 8. Thus, an operation related to the present embodiment is not performed. When the edge server 128 selects a specific area as a high-priority area, a vehicle that is present in the high-priority area, that has a predetermined sensor, and that has a sensor detection range including the selected high-priority area or that is likely to move to such a position in the near future is selected as a candidate vehicle. To the selected vehicle, an inquiry about a dataset ID is transmitted together with the dataset table selected by the edge server 128 in process 306 in FIG. 7.

In response to receipt of this inquiry, the vehicle starts the execution of the program in FIG. 8, an affirmative determination is made in step 340, and the line speed available to the vehicle, the degree of congestion of the intra-vehicle network, and the CPU resource are checked in steps 342, 344, and 346, respectively. Subsequently, on the basis of the individual values, dataset IDs in the dataset table received from the edge server 128 are determined in steps 348, 350, and 352 in this order. Furthermore, in step 354, the dataset ID associated with the smallest amount of transmission data, that is, the dataset ID having the smallest value, is selected from among these dataset IDs, and the selected dataset ID is transmitted to the edge server 128 in step 356.

The edger server 128 transmits a sensor data transmission instruction to a limited number of vehicles in the target area on the basis of the responses from the individual vehicles. Accordingly, the vehicle starts, in step 366 after steps 340, 360, and 364 in FIG. 8, a process of transmitting the sensor data of the sensor selected in accordance with the dataset ID selected in step 354 at the selected data transmission interval. That is, if a sensor data transmission process has not been activated, the sensor data transmission process is activated in this step. If the sensor data transmission process has been activated, nothing is performed. The execution of this program ends upon termination of step 366.

On the other hand, to a vehicle that is not selected as a vehicle that is to transmit sensor data in the target area, a data transmission stop instruction is transmitted in step 314 in FIG. 7. The vehicle that has received the stop instruction starts the execution of the program in FIG. 8, and data transmission is stopped in step 362 after steps 340 and 360. That is, if the data transmission process is running, the process is stopped. If the data transmission process is not running, nothing is performed.

On the other hand, when a vehicle has exited from the target area, the following process is executed. Referring to FIG. 7, in step 296, an instruction to transmit sensor data in a longer period (or with lower priority) than that in the vehicle in the area is transmitted to a vehicle outside the area extracted in step 290. The vehicle that has received this transmission instruction activates the program in FIG. 8. In this case, the process of step 366 is started after steps 340, 360, and 364, and a data transmission process is started.

As described above, according to the present embodiment, in an area satisfying a predetermined condition, only a vehicle capable of most efficiently transmitting to the edge server 128 the sensor data that is of the portion for creating a traffic status overview map and that is most effective to create the traffic status overview map transmits the sensor data in accordance with a sensor priority policy corresponding to the condition of the area, and no other vehicles transmit sensor data. The traffic status overview map can be appropriately created without the amount of data transmitted to the edge server 128 being excessive. In the target area, a sensor priority policy corresponding to the reason for being selected as the target is adopted, and a vehicle capable of transmitting sensor data while conforming to the sensor priority policy is selected. Thus, it is possible to transmit the most necessary data to the edge server 128 in accordance with a traffic status and to create a traffic status overview map sufficiently reflecting the necessary information.

Furthermore, transmission dataset tables are managed by the edge server 128 and are transmitted to individual vehicles as appropriate. Thus, the abilities of transmitting sensor data to the edge server 128 of the individual vehicles can be compared with each other without ambiguousness, and a vehicle capable of transmitting appropriate sensor data to the edge server 128 can be selected advantageously.

Second Embodiment

<Configuration>

The above-described first embodiment is based on the assumption that at least one vehicle in each area is capable of transmitting sensor data to the edge server with a required data transmission ability. However, the status of wireless communication constantly changes. For example, when switching between areas managed by a base station is performed in mobile communication or when a communication environment is hampered by a large-size vehicle, a situation may occur in which a vehicle capable of transmitting sufficient data is absent. For example, in an accident area, a detailed image of a vehicle involved in the accident is necessary, but it is not necessary to transmit a detailed image to a server in a short time because the vehicle involved in the accident does not move. In such a case, it may be desired for the server to receive detailed image data even if there is a time lag. In the first embodiment, all vehicles within an area do not necessarily have a sufficiently high data transmission ability, and thus such a situation is not sufficiently addressed. The second embodiment described below is for addressing such an issue.

The above-described area may be, for example, an area in which it is desired to obtain a detailed image or the like of a target even if there is a time lag, such as the above-described accident area or an area in which a disabled vehicle is present.

In the following second embodiment, hardware similar to that illustrated in the first embodiment may be used. The difference from the first embodiment is in the control structure of a program executed by the edge server 128 and each vehicle 82 or the like.

<<Traffic Assistance Server>>

Figure 9:
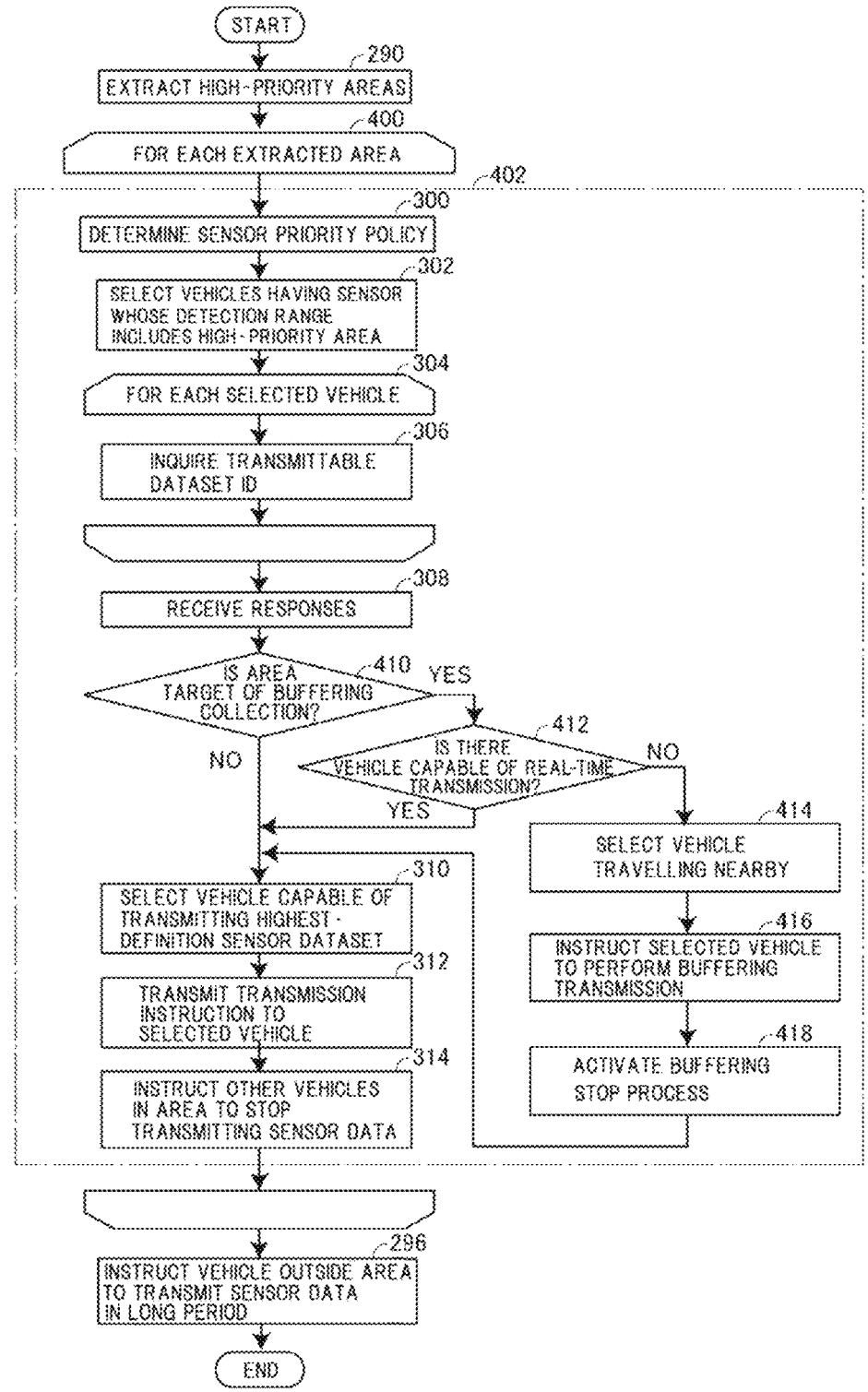
FIG. 9 is a flowchart illustrating the control structure of a program for controlling communication from a vehicle, the program being executed by a traffic assistance server according to a second embodiment of the present disclosure.

FIG. 9 illustrates, in the form of a flowchart, the control structure of a program corresponding to that illustrated in FIG. 7 executed by an edge server having functions similar to those of the edge server 128 according to the first embodiment in the present embodiment (hereinafter simply referred to as an "edge server").

Referring to FIG. 9, this program is different from the program according to the first embodiment illustrated in FIG. 7 in that this program includes step 400 of executing process 402 instead of step 292 of executing process 294 in FIG. 7.

Process 402 is different from process 294 in that the following steps are included between step 308 and step 310: step 410 of determining whether or not the target area is an area of a buffering target (for example, an accident area or a disabled vehicle detection area) and causing the flow of control to branch off in accordance with the determination; step 412 of, if the determination in step 410 is affirmative, determining whether or not a vehicle capable of transmitting sensor data in real time is present within the area and causing the flow of control to branch off in accordance with the determination; step 414 of, if the determination in step 412 is negative, selecting any one of vehicles present in a target portion in the area (the position of a vehicle involved in an accident or a disabled vehicle) and vehicles travelling toward the portion; step 416, following step 414, of transmitting a buffering transmission instruction to the vehicle selected in step 414; and step 418 of, in response to receipt of an instruction to finish the buffering process from the edge server after step 416, activating a process for finishing the buffering process in response to the instruction and causing the flow of control to proceed to step 310. Here, buffering transmission means a process of temporarily buffering sensor data in the storage device in the vehicle-mounted device and transmitting the sensor data to the edge server when the line status is improved, instead of transmitting the sensor data to the edge server 128 in real time. At the time of transmitting buffered sensor data to the edge server, a high transmission speed is not necessarily required, and the sensor data may be transmitted with lower priority than other communication (for example, the latest sensor information that has been obtained).

If the determination in step 410 is negative or if the determination in step 412 is affirmative, the control proceeds to step 310.

The determination in step 412 is made by transmitting an inquiry to the vehicles in the area in process 306 and determining whether the responses received in step 308 include a response indicating a transmission ability for transmitting a detailed image in real time.

<<Vehicle-mounted Device>>

Figure 10:
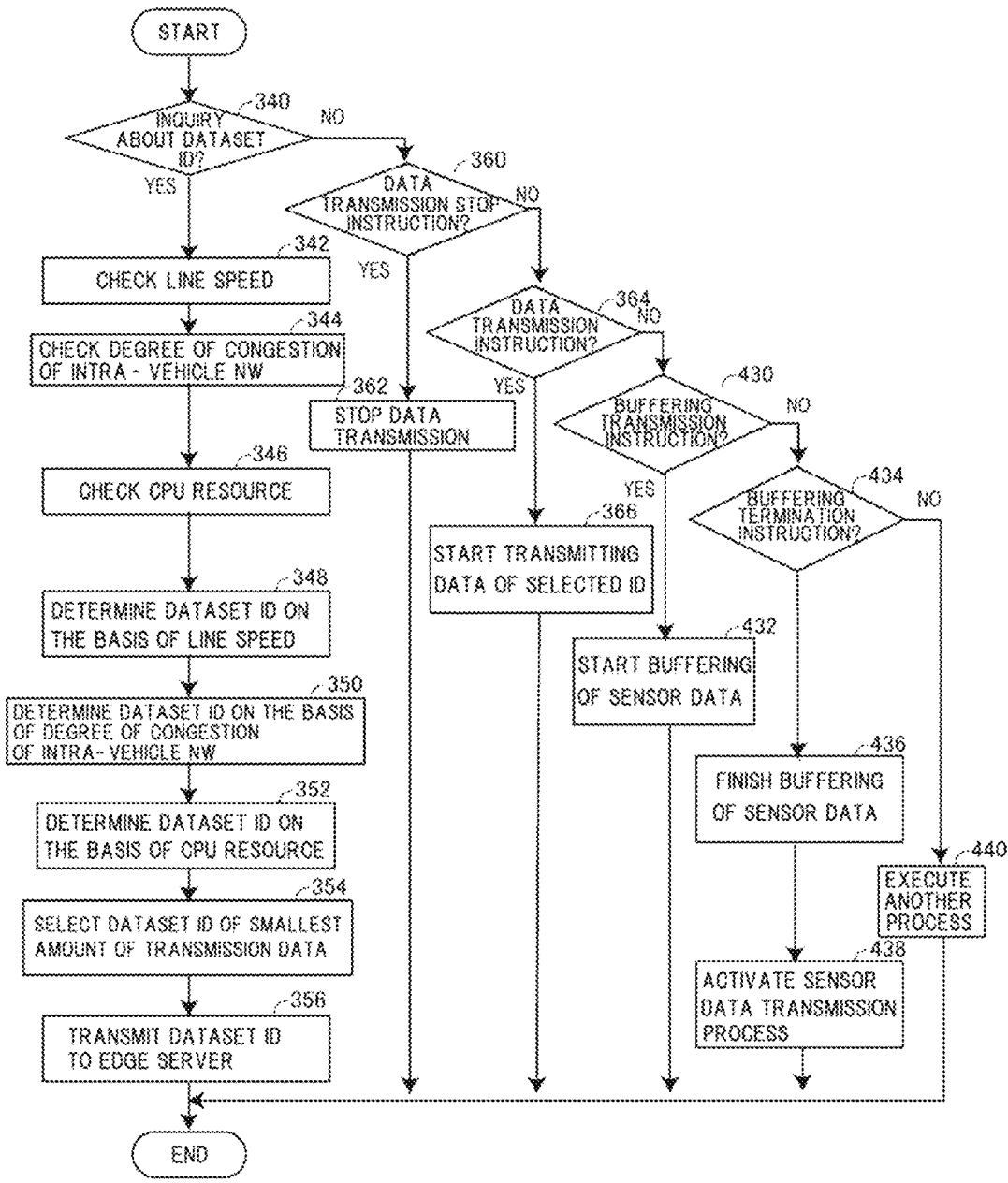
FIG. 10 is a flowchart illustrating the control structure of a program for controlling transmission of sensor data, the program being executed by a vehicle-mounted device in a traffic assistance system according to the second embodiment.

The vehicle-mounted device requires a program of executing the process corresponding to the new steps 410 to 418. FIG. 10 illustrates the control structure of the program in the form of a flowchart. The control structure of the program illustrated in FIG. 10 is similar to that illustrated in FIG. 8, but includes, instead of step 368 illustrated in FIG. 8, step 430 of, if the determination in step 364 is negative, determining whether or not the received event is a buffering transmission instruction and causing the flow of control to branch off in accordance with the determination; step 432 of, if the determination in step 430 is affirmative, starting a buffering process of sensor data from the sensor of the vehicle and finishing the execution of this program; step 434 of, if the determination in step 430 is negative, determining whether or not the received event is a buffering termination instruction and causing the flow of control to branch off in accordance with the determination; step 436 of, if the determination in step 434 is affirmative, finishing the buffering process; step 438 of starting a process for transmitting the buffered sensor data to the edge server 128 after step 436 and finishing the execution of this program; and step 440 of, if the determination in step 434 is negative, executing another process not related to transmission of sensor data according to the present embodiment and finishing the execution of this program.

Figure 11:
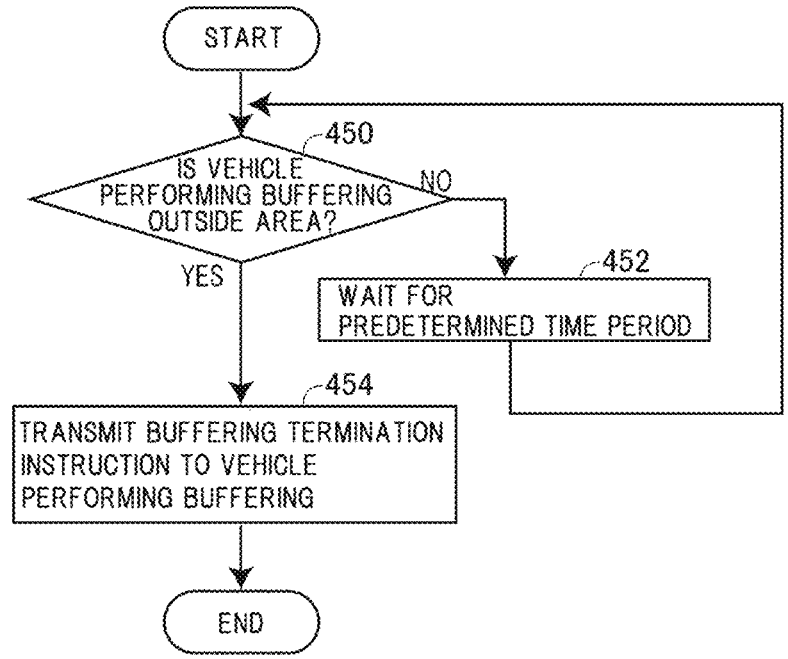
FIG. 11 is a flowchart illustrating the control structure of a program for controlling buffering and transmission of sensor data, the program being executed by the vehicle-mounted device in the traffic assistance system according to the second embodiment.

Furthermore, in the present embodiment, a program for finishing a buffering process when a condition of finishing the buffering process is satisfied and starting a process of transmitting buffered data to the edge server is required. FIG. 11 illustrates, in the form of a flowchart, the control structure of a program of implementing a process that is activated in step 418 in FIG. 9 and that is executed by the edge server 128.

Referring to FIG. 11, this program includes step 450 of determining whether or not a vehicle executing buffering has exited from a buffering target area and causing the flow of control to branch off; step 452 of, if the determination in step 450 is negative, waiting for a certain time period and causing the control to return to step 450; and step 454 of, if the determination in step 450 is affirmative, instructing the vehicle executing buffering to stop buffering and finishing this process.

Figure 12:
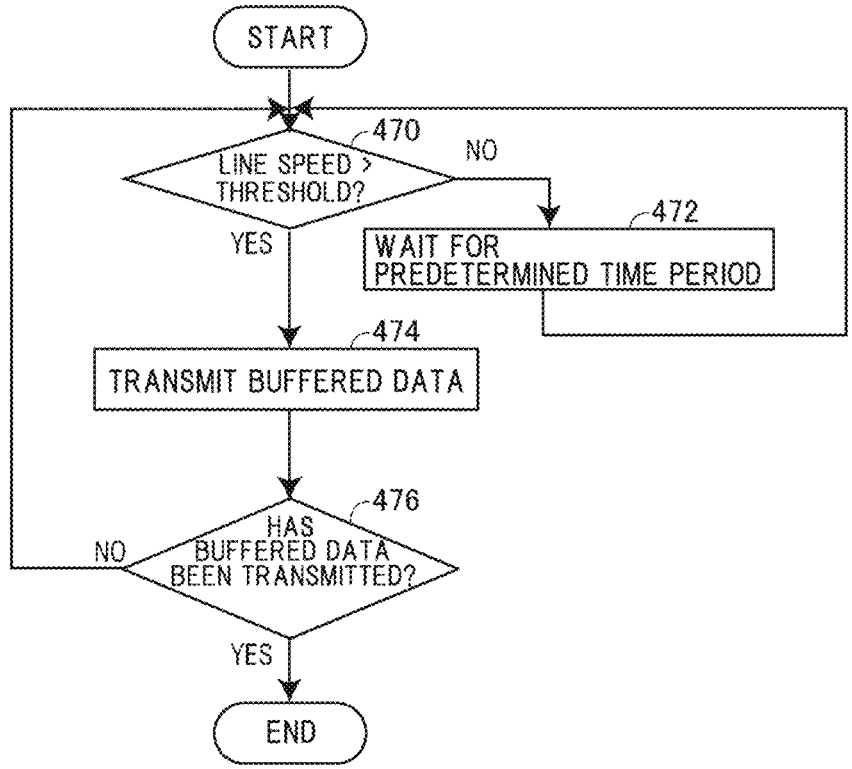
FIG. 12 is a flowchart illustrating the control structure of a program for stopping a buffering process, the program being executed by a vehicle-mounted device mounted in a vehicle executing the buffering process.

The instruction to stop buffering transmitted from the program executed on the edge server 128 side to the vehicle-mounted device performing buffering is processed by the process activated in step 438 in FIG. 10. Referring to FIG. 12, the program executed in this process includes step 470 of determining whether or not an available line speed is higher than a predetermined threshold and causing the flow of control to branch off in accordance with the determination result; and step 472 of, if the determination in step 470 is negative, waiting for a predetermined waiting time period and causing the control to return to step 470.

This program further includes step 474 of, if the determination in step 470 is affirmative, transmitting a total certain amount of buffered sensor data to the edger server; and step 476 of determining whether or not the transmission of the buffered data has been completely finished after step 474 and finishing the execution of this program if the determination is affirmative. If the determination in step 476 is negative, the control returns to step 470. The transmission of buffered data in step 474 may be performed with a low priority compared to the transmission of other data, such as the latest sensor data.

A buffer memory is necessary for buffering. The buffer memory may be included in each ECU or in the inside-vehicle/outside-vehicle cooperation unit 164. Alternatively, a storage device different from each ECU or the inside-vehicle/outside-vehicle cooperation unit 164 may be used as a buffer memory.

<Operation>

Regarding the operation according to the second embodiment, only the difference from the operation according to the first embodiment will be described.

In the edge server, referring to FIG. 9, it is determined in step 410 after step 308 whether or not the area extracted in step 290 is a target area of buffering collection of sensor data as described above. If the determination is negative, the control proceeds to step 310, and thereafter a process similar to that of the first embodiment is executed.

If the determination in step 410 is affirmative, it is determined in step 412 whether or not a vehicle capable of transmitting image data having a sufficient resolution in real time is present within the area. If such a vehicle is present, it is not necessary to collect image data by buffering. Thus, if the determination in step 412 is affirmative, the control proceeds to step 310, and thereafter a process similar to that of the first embodiment is executed.

If the determination in step 412 is negative, it is necessary to collect detailed image data of the area by buffering. Thus, in step 414, any one vehicle is selected from among vehicles that are travelling nearby and that have a camera capable of capturing an image of a target portion (the position or the like of a vehicle involved in an accident or a disabled vehicle) in the area with a sufficiently high resolution. In the following step 416, a buffering transmission instruction is transmitted to the vehicle. After that, in response to receipt of an instruction to stop buffering from the edge server, a process for stopping the buffering process is activated in step 418, the control proceeds to step 310, and then a process similar to that of the first embodiment is executed.

On the other hand, each vehicle-mounted device operates in the following manner. The vehicle that has received the buffering transmission instruction transmitted in step 416 executes the following process. Also regarding this process, only the difference from the process executed by a vehicle according to the first embodiment will be described.

Referring to FIG. 10, as an instruction related to buffering transmission, the event of activating a process in FIG. 10 is only the time of receiving a buffering transmission instruction. At this time, buffering of sensor data is started in step 432 after steps 340, 360, 364, and 430. That is, a sensor data buffering process is started. Upon the buffering process being started, the execution of this program is finished.

In the edge server, in the process activated in step 418 in FIG. 9, the program whose control structure is illustrated in FIG. 11 is executed. That is, it is determined in step 450 whether or not a vehicle performing a buffering process has exited from the high-priority area. If the vehicle is in the buffering target area, step 452 of waiting only for a predetermined waiting time period is performed, and then the control returns to step 450. That is, a vehicle continues buffering as long as the vehicle is within the buffering target area. If the determination in step 450 is affirmative, that is, if the vehicle has exited from the buffering target area, a buffering process termination instruction is transmitted to the vehicle-mounted device of the vehicle in step 454.

The vehicle-mounted device that has received the buffering process termination instruction from the edge server 128 finishes the buffering in step 436 after performing steps 340, 360, 364, 430, 434, and 436 illustrated in FIG. 10 in this order, and a buffered data transmission process is started in the following step 438.

Referring to FIG. 12, the following process is executed in the buffered data transmission process. That is, it is determined in step 470 whether or not the line speed is higher than a certain value. If the line speed is lower than or equal to the certain value, step 472 of waiting for only a certain waiting time period is performed, and then the control returns to step 470.

If the line speed is higher than the certain value, the control proceeds to step 474, where a certain amount of the buffered sensor data is transmitted to the edge server. In the following step 476, it is determined whether or not all the buffered data has been transmitted. If there is buffered data that has not been transmitted, the control proceeds to step 470. If all the buffered data has been transmitted, an affirmative determination is made in step 476, and the execution of this program is finished. That is, the buffered sensor data is transmitted to the edge server in units of certain amounts when the line speed is higher than the certain value. If the line speed becomes lower than or equal to the certain value during transmission, transmission of the buffered data is stopped. When the line speed becomes higher than the certain value, transmission of the buffered data is restarted. After all the buffered data has been transmitted to the edge server, this process is finished.

As described above, in the second embodiment, in addition to the advantages of the first embodiment being obtained, a vehicle capable of transmitting detailed sensor data to the edge server with a certain delay is selected for an area that requires a large amount of data such as detailed image data and that does not require real-time information, such as an accident area or a disabled vehicle detection area. A limited vehicle transmits such data, and thus a situation can be prevented in which the edge server receives a large amount of data and the processing load is excessive. In addition, when each vehicle transmits buffered sensor data to the edge server, the vehicle transmits information with low priority in accordance with the line speed. Thus, an influence on other communication is small. Detailed data is transmitted to the edge server, and thus the quality of the traffic status overview map maintained and managed by the edge server can be kept high.

In the above-described first and second embodiments, in steps 348, 350, 352, and the like in FIG. 8, the identifier of a transmittable maximum-level item is determined in the transmission sensor dataset. However, the present disclosure is not limited to such embodiments. For example, a vehicle capable of most efficiently transmitting sensor data within a certain band usage ratio may be selected without using the standard of the transmittable maximum level. In this case, a transmission speed is calculated on the basis of a value obtained by multiplying the line speed checked in step 342 by an upper limit of the band usage ratio (the value is determined in advance), and the identifier of a transmittable maximum-level item is determined in the transmission sensor dataset on the basis of the result. Here, the band usage ratio is a value obtained by dividing the amount of transmission sensor data by the line speed. If a transmittable maximum amount of data is transmitted within the line speed, a maximum delay may increase. In contrast, as a result of performing transmission under a condition in which the band usage ratio with respect to the line speed is smaller than or equal to a certain value as described above, stable transmission can be performed with a maximum delay being within a certain value.

In the above-described embodiments, the line speed is checked by each vehicle-mounted device, and a transmission dataset is determined. However, the present disclosure is not limited to such embodiments. For example, the edge server may manage and maintain a communication speed map on the basis of the line speeds at individual positions in the area managed by the edge server, and may determine the identifier of a transmission sensor dataset on the basis of the line speeds of individual vehicles determined from the communication speed map and the positions of the individual vehicles. In this case, the edge server may determine the identifier of a transmission sensor dataset on the basis of only the line speed. Alternatively, the line speed may be included in an inquiry transmitted from the edge server to each of candidate vehicles, and each candidate vehicle may use the line speed received from the server when determining the identifier of a transmission sensor dataset.

[Implementation by Computer]

Figure 13:
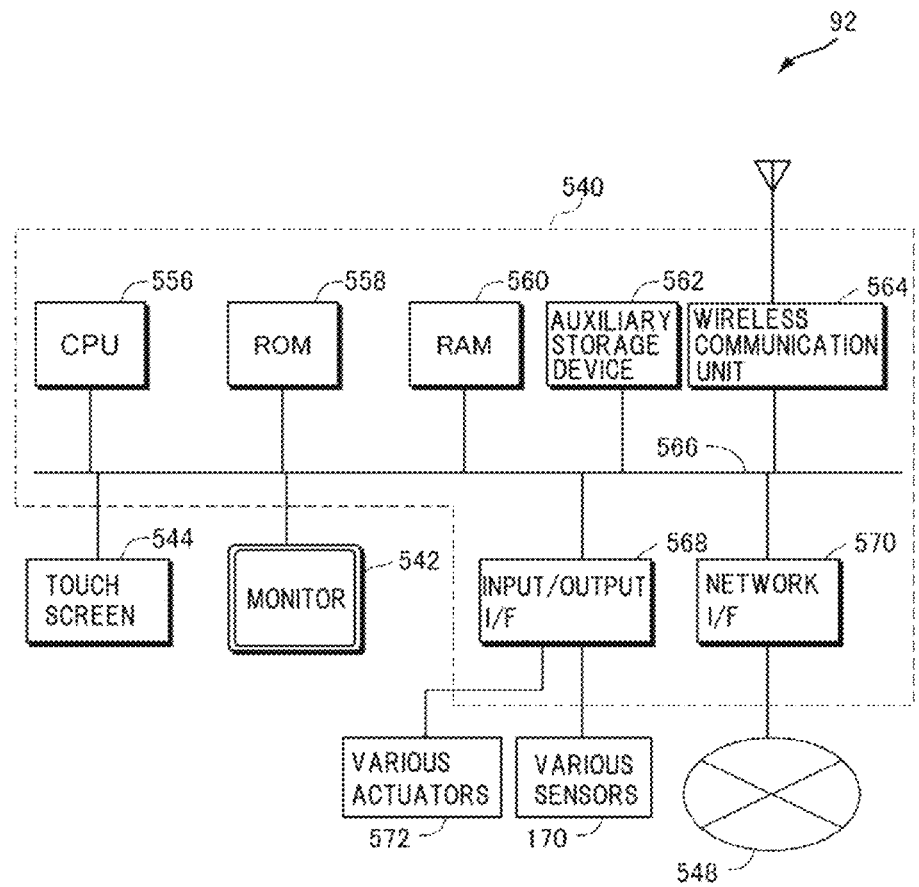
FIG. 13 is a schematic block diagram of a computer implementing the vehicle-mounted device according to the first and second embodiments.

The vehicle-mounted device 92 having mounted therein the inside-vehicle/outside-vehicle cooperation unit 164, and the edge server 128, according to the above-described embodiments of the present disclosure are both implemented by computer hardware including a processor, a program executed by the computer hardware and having the above-described control structure, and data sored in the computer hardware. FIG. 13 illustrates the configuration of a computer 540 that implements the vehicle-mounted device 92, FIG. 14 illustrates the external appearance of a computer that implements the edge server 128, and FIG. 15 illustrates the internal configuration of the computer illustrated in FIG. 14.

Referring to FIG. 13, the computer 540 that implements the vehicle-mounted device 92 includes a CPU 556; a bus 566 connected to the CPU 556; a read only memory (ROM) 558 that stores a boot-up program or the like of the computer 540; a random access memory (RAM) 560 that is connected to the bus 566 and that stores a program instruction, a system program, operation data, and so forth; and an auxiliary storage device 562 which is a nonvolatile memory. The computer 540 further includes a network interface (I/F) 570 that provides connection to a network 548 that enables communication with another terminal; an input/output I/F 568 for connecting various actuators 572 and the various sensors 170 to the bus 566; and a touch screen 544 and a monitor 542 that are connected to the bus 566 and that are to be used by a user to operate the computer 540 or used to present information to a user from the computer 540.

A computer program for causing the computer 540 to operate as the vehicle-mounted device 92 and the functions of the elements of the vehicle-mounted device 92 is stored in the ROM 558, is loaded to the RAM 560 at the time of execution, and is interpreted and executed by the CPU 556.

Figure 14:
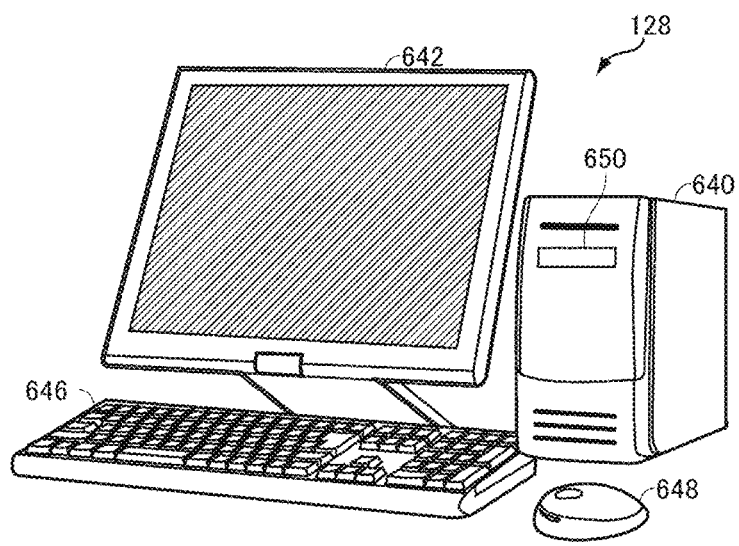
FIG. 14 is a diagram illustrating the external appearance of a computer implementing the traffic assistance server according to the first and second embodiments.
Figure 15:
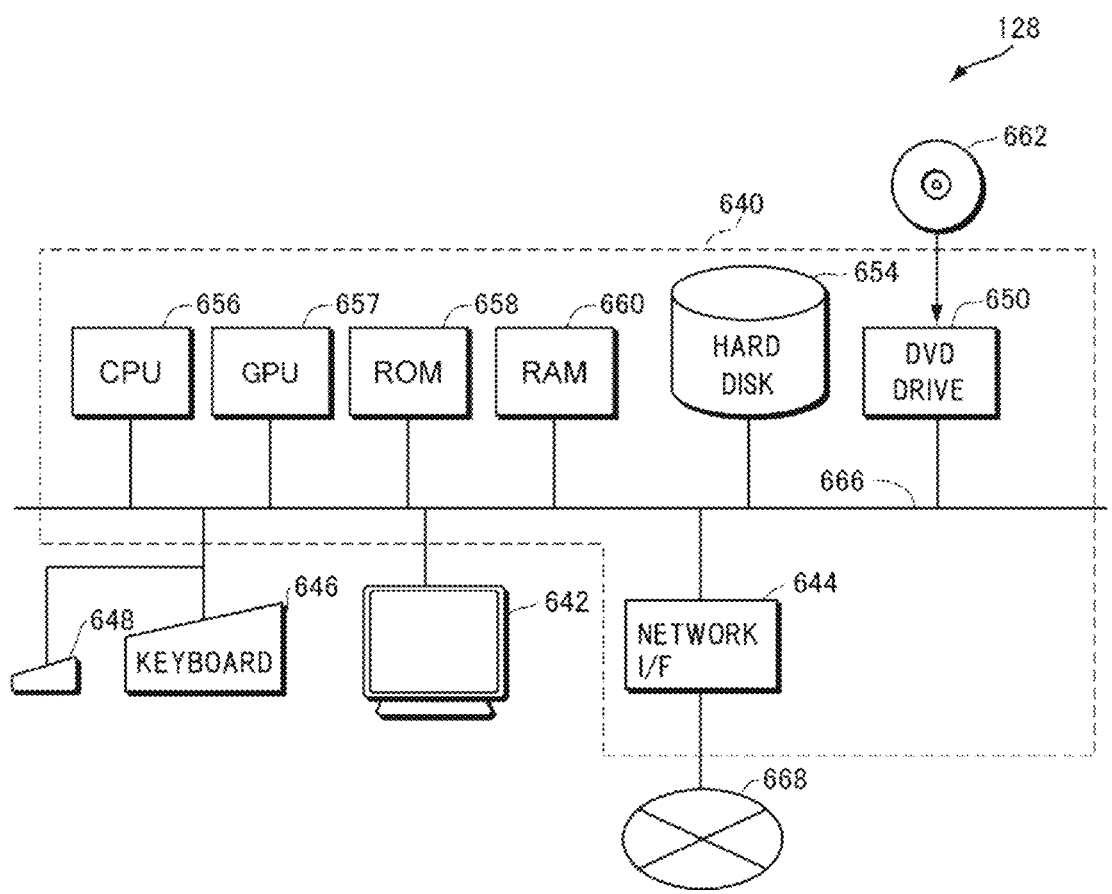
FIG. 15 is a schematic block diagram of the computer implementing the traffic assistance server according to the first and second embodiments.

Referring to FIG. 14, this computer system that implements the edge server 128 includes a computer 640 including a digital versatile disc (DVD) drive 650, a keyboard 646, a mouse 648, and a monitor 642.

Referring to FIG. 15, the computer 640 includes, in addition to the DVD drive 650, a CPU 656; a graphic processing unit (GPU) 657; a bus 666 connected to the CPU 656, the GPU 657, and the DVD drive 650; a ROM 658 that stores a boot-up program or the like; a RAM 660 that is connected to the bus 666 and that stores a program instruction, a system program, operation data, and so forth; and a hard disk drive (HDD) 654 which is a nonvolatile memory. The computer 640 further includes a network I/F 644 that provides connection to a network 668 that enables communication with another terminal.

In each of the above-described embodiments, the analysis results 213, 217, and 225, the vehicle information 221, and so forth illustrated in FIG. 5 are stored in the HDD 654 or the RAM 660. That is, the HDD 654 and the RAM 660 implement the analysis result storage units 214, 218, and 226, the vehicle information storage unit 222, and so forth.

A computer program for causing this computer system to operate as the edge server 128 and the functions of the elements of the edge server 128 is stored in a DVD 662 loaded into the DVD drive 650 and is transferred from the DVD drive 650 to the HDD 654. Alternatively, the program may be transmitted through the network 668 to the computer 640 and may be sored in the HDD 654. The program is loaded to the RAM 660 at the time of execution thereof. The program may be directly loaded to the RAM 660 from the DVD 662 or via the network.

This program includes a plurality of instructions that cause the computer 640 to operate as the edge server 128 according to the above-described embodiments. Some of basic functions that are necessary to perform the operation are provided by an operating system (OS) operating in the computer 640, a third-party program, or a module of various tool kits installed in the computer 640. Thus, this program does not necessarily include all the functions that are necessary to implement the system and method according to the embodiments. It is sufficient for this program to include only an instruction of executing the operation of the above-described edge server 128 and the elements thereof by calling, in an instruction, an appropriate function in a "programing tool kit" by using a method controlled to obtain a desired result. The same applies to the case of the computer 540 illustrated in FIG. 13. The operations of the computers 540 and 640 are known and thus are not described here. The GPU 657 is capable of performing parallel processing, and effectively functions at the time of generating or managing a traffic status overview map about many dynamic objects in simultaneous and parallel processing.

As described above, in the second embodiment, in addition to the advantages of the first embodiment being obtained, detailed sensor data can be transmitted to the edge server with a certain delay for an area that requires a large amount of data such as detailed image data and that does not require real-time information, such as an accident area or a disabled vehicle detection area. A limited vehicle transmits such data, and thus a situation can be prevented in which the edge server receives a large amount of data and the processing load is excessive. In addition, when each vehicle transmits buffered sensor data to the edge server, the vehicle transmits information with low priority. Thus, an influence on other communication is small. Detailed data is transmitted to the edge server, and thus the quality of the traffic status overview map maintained and managed by the edge server can be kept high.

In a case where the edge server 128 has the GPU 657 mounted therein as described above, for example, the determination of a policy by the policy determining unit 244 illustrated in FIG. 5 can be realized by a neural network that has learned in advance. In this case, an input to the neural network is a fixed-length vector including, as elements, a total number of dynamic objects, a total number of humans, a total number of children, and a total number of vehicles, detected in the area, the size of the area, and so forth, and a probability of selecting each sensor priority policy can be obtained as an output. At the time of learning, the above-described input vector may be created on the basis of an actual traffic status, and the input vector may be used as training data together with data generated by designating a sensor priority policy by a human.

The function of the inside-vehicle/outside vehicle cooperation nit 164 in the above-described vehicle-mounted device 92 can be implemented as a semiconductor integrated circuit. A processor, a memory, and a communication function may be mounted on the semiconductor integrated circuit, and a necessary program may be stored in the memory in advance. Instead of the processor, an application specific semiconductor integrated circuit may be used. Alternatively, the above-described function may be implemented by a combination of discrete semiconductor devices, such as a field programmable gate array (FPGA).

The embodiments disclosed herein are merely examples, and the present disclosure is not limited only to the above-described embodiments. The scope of the present disclosure is indicated by each of the claims in view of the detailed description of the disclosure, and includes all changes within the meaning and scope equivalent to the wording used in the claims.

REFERENCE SIGNS LIST 50 real space
52, 150, 225 traffic status overview map
70 communication system
180 infrastructure sensor facility
82, 84 vehicle
86 pedestrian
88 infrastructure camera
90 traffic signal controller
92, 94 vehicle-mounted device
96 mobile phone
98, 100 wireless communication device
110, 112, 114 base station
122 metro NW
124, 130 distributed DC
126, 128 edge server
140 core NW
142 core DC
144 core server
160 NSW
162 outside-vehicle communication device
164 inside-vehicle/outside-vehicle cooperation unit
170 sensor
172 autonomous driving ECU
190 infrastructure sensor
192 communication device
210 reception processing unit
212 dynamic object tracking unit
213, 217 analysis result
214 first analysis result storage unit
216 attribute detecting unit
218 second analysis result storage unit
220 vehicle tracking unit
222 vehicle information storage unit
224 combining processing unit
226 third analysis result storage unit
228 information transmitting unit
230 transmission processing unit
240 high-priority area extracting unit
242 sensor priority policy storage unit
244 policy determining unit
246 candidate vehicle selecting unit
248 transmission dataset table storage unit
250 dataset inquiring unit
252 vehicle selecting unit
254 inquiry transmitting/receiving unit
270, 272, 274 transmission dataset table
290, 292, 296, 300, 302, 304, 308, 310, 312, 314, 340, 342, 344, 346, 348, 350, 352, 354, 356, 360, 362, 364, 366, 368, 400, 410, 412, 414, 416, 430, 432, 450, 452, 454, 456 step
294, 306, 402 process
540, 640 computer
542, 642 monitor
544 touch screen
548, 668 network
556, 656 CPU
558, 658 ROM
560, 660 RAM
562 auxiliary storage device
564 wireless communication unit
566 bus
568 input/output I/F
570, 644 network I/F
572 various actuators
646 keyboard
648 mouse
650 DVD drive
654 hard disk drive
657 GPU

662 DVD

The invention claimed is:

1. A vehicle-mounted device used in a traffic assistance system including
  a plurality of vehicle-mounted devices each of which is mounted in one of a plurality of vehicles, each of the plurality of vehicles being equipped with a plurality of types of sensors each of which is capable of collecting data about a surrounding environment, and
  a traffic assistance server that collects data from the sensors to create a traffic status overview map representing a traffic status in a predetermined range and transmits data for driving assistance to the plurality of vehicle-mounted devices on the basis of the traffic status overview map, via wireless communication with each of the plurality of vehicle-mounted devices,
  the vehicle-mounted device comprising:
    a data collecting device that collects sensor data which is data from the sensors equipped in the vehicle having mounted therein the vehicle-mounted device;
    a wireless communication device that wirelessly communicates with a device outside of the vehicle;
    a sensor data transmitting device that transmits the sensor data to the traffic assistance server via the wireless communication device;
    an outside-vehicle status data receiving device that receives data about an outside-vehicle status from a device outside of the vehicle via the wireless communication device; and
    an inside-vehicle/outside-vehicle cooperation device that, in response to receipt of the data about the outside-vehicle status, cooperates with a device outside the vehicle and changes an operation inside the vehicle including an operation of the sensor data transmitting device,
  wherein the inside-vehicle/outside-vehicle cooperation device includes a transmission control device that, in response to receipt of an instruction of permitting or prohibiting transmission of sensor data from the traffic assistance server, controls the sensor data transmitting device in accordance with the instruction.

2. The vehicle-mounted device according to claim 1, wherein the traffic assistance server determines a sensor priority policy indicating a priority with which sensor data is to be transmitted in accordance with a type of the sensor data, and transmits, to the vehicle-mounted device, an inquiry inquiring a transmission ability for sensor data transmittable to the traffic assistance server for maintaining the traffic status overview map in view of a line status, together with data indicating the determined sensor priority policy, and
wherein the vehicle-mounted device further includes a responding device that, in response to receipt of the inquiry, calculates the transmission ability on the basis of the received data indicating the sensor priority policy, and any combination of a line speed available for communication with the traffic assistance server, a degree of congestion of an intra-vehicle network of the vehicle having mounted therein the vehicle-mounted device, and a calculation resource available to the vehicle-mounted device, and transmits a response to the traffic assistance server via the wireless communication device.

3. The vehicle-mounted device according to claim 2, wherein the responding device includes
  a transmission ability calculating device that, in response to receipt of the inquiry, calculates transmission abilities by using the line speed, the degree of congestion of the intra-vehicle network, and the calculation resource available to the vehicle-mounted device, respectively, on the basis of a data generation amount per unit time determined by types and abilities of the sensors equipped in the vehicle having mounted therein the vehicle-mounted device, and the data indicating the sensor priority policy received from the inquiring device, and
  a transmission ability selecting device that selects a lowest transmission ability from among the transmission abilities calculated by the transmission ability calculating device and transmits the selected transmission ability to the traffic assistance server.

4. The vehicle-mounted device according to claim 1, wherein the inside-vehicle/outside-vehicle cooperation device further includes
  a transmission continuing device that, in response to receipt of the instruction of permitting transmission of the sensor data from the traffic assistance server via the wireless communication device, continues a process of transmitting the sensor data to the traffic assistance server by the sensor data transmitting device, and
  a transmission stopping device that, in response to receipt of the instruction of prohibiting transmission of the sensor data from the traffic assistance server via the wireless communication device, stops transmission of the sensor data by the sensor data transmitting device.

5. The vehicle-mounted device according to claim 1, wherein the sensor data transmitting device includes a sensor data/detection range transmitting device that transmits, to the traffic assistance server via the wireless communication device, the sensor data and data indicating a detection range of the sensors of the vehicle having mounted therein the vehicle-mounted device.

6. The vehicle-mounted device according to claim 1, wherein the traffic assistance server has a function of transmitting, to the vehicle-mounted device, a buffering instruction to buffer sensor data for an area satisfying a specific condition and transmit the buffered sensor data to the traffic assistance server at a transmittable timing,
wherein the vehicle-mounted device further includes
  a buffering device that performs buffering on sensor data from each sensor equipped in the vehicle having mounted therein the vehicle-mounted device, and
  a buffered data transmitting device that transmits the sensor data buffered by the buffering device to the traffic assistance server, and
wherein the inside-vehicle/outside-vehicle cooperation device further includes
  a buffering starting device that, in response to receipt of the buffering instruction, causes the buffering device to start buffering,
  a buffered data transmission starting device that, in response to a line speed from the vehicle-mounted device to the traffic assistance server being higher than or equal to a predetermined value, causes the buffered data transmitting device to start transmitting sensor data,
  a buffering stopping device that, in response to termination of data transmission by the buffered data transmitting device, causes the buffering device to stop the buffering of the sensor data, and
  a sensor data transmission starting device that, in response to termination of data transmission by the buffered data transmitting device, causes the sensor data transmitting device to start transmitting the sensor data to the traffic assistance server.

\* \* \* \* \*